United States Patent
Shen et al.

(10) Patent No.: US 10,277,289 B2
(45) Date of Patent: Apr. 30, 2019

(54) RADIO TRANSMISSION STATION AND RADIO COMMUNICATION NETWORK

(71) Applicant: NTT DOCOMO, INC., Tokyo (JP)

(72) Inventors: Jiyun Shen, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 29 days.

(21) Appl. No.: 15/329,002

(22) PCT Filed: Jul. 23, 2015

(86) PCT No.: PCT/JP2015/070941
§ 371 (c)(1),
(2) Date: Jan. 25, 2017

(87) PCT Pub. No.: WO2016/013608
PCT Pub. Date: Jan. 28, 2016

(65) Prior Publication Data
US 2017/0222693 A1      Aug. 3, 2017

(30) Foreign Application Priority Data
Jul. 25, 2014   (JP) ................................. 2014-152035

(51) Int. Cl.
*H04B 7/04*      (2017.01)
*H04B 7/0426*    (2017.01)
(Continued)

(52) U.S. Cl.
CPC ........... *H04B 7/043* (2013.01); *H04B 7/0408* (2013.01); *H04B 7/0456* (2013.01);
(Continued)

(58) Field of Classification Search
CPC .... H04B 7/043; H04B 7/0408; H04B 7/0617; H04B 7/0456; H04B 7/0695; H04B 7/0626; H04L 5/0048; H04L 5/0053
(Continued)

(56) References Cited

U.S. PATENT DOCUMENTS 7,003,310 B1 * 2/2006 Youssefmir .......... H04B 7/0617
                                                                455/101
2015/0382334 A1 * 12/2015 El Ayach .............. H04W 16/28
                                                                370/336

FOREIGN PATENT DOCUMENTS

JP      2010-068530 A    3/2010
JP      2012-517152 A    7/2012
(Continued)

OTHER PUBLICATIONS

Extended European Search Report issued in corresponding European Patent Application No. 15824773.4, dated Jul. 24, 2017 (10 pages).

(Continued)

*Primary Examiner* — Obaidul Huq
(74) *Attorney, Agent, or Firm* — Osha Liang LLP

(57) ABSTRACT

A radio transmission station gives beamforming weights to electrical signals to control directions of radio-wave beams emitted from transmitting antennas. The radio transmission station generates a beam-discovery signal (BDS) that enables a radio reception station, after the radio reception station receives the beams, to identify the directions of the beams, and emits the BDS beams in multiple directions. The radio transmission station determines, based on at least one of the surroundings of the radio transmission station and a situation of the radio reception station, an arrangement pattern of multiple resource points to which the BDS is mapped. Based on information that is reported from the radio reception station and indicates a suitable direction
(Continued)

among the directions of the beams, the radio transmission station determines a suitable beamforming weight that is to be given to a data signal addressed to the radio reception station.

13 Claims, 24 Drawing Sheets

(51) Int. Cl.
*H04B 7/0408* (2017.01)
*H04B 7/06* (2006.01)
*H04L 5/00* (2006.01)
*H04B 7/0456* (2017.01)

(52) U.S. Cl.
CPC ......... *H04B 7/0617* (2013.01); *H04B 7/0695* (2013.01); *H04L 5/0048* (2013.01); *H04L 5/0053* (2013.01); *H04B 7/0626* (2013.01)

(58) Field of Classification Search
USPC .......................................... 370/310, 328, 329
See application file for complete search history.

(56) References Cited

FOREIGN PATENT DOCUMENTS

| JP | 2013-232741 A | 11/2013 |
| WO | 2010/088664 A2 | 8/2010 |
| WO | 2014/007713 A1 | 1/2014 |

OTHER PUBLICATIONS

Stefania Sesia, et al., "LTE—The UMTS Long Term Evolution", from Theory to Practice, John Wiley & Sons, Inc., 2011 (4 pages).
International Search Report issued in corresponding application No. PCT/JP2015/070941 dated Aug. 25, 2015 (2 pages).

* cited by examiner

RADIO TRANSMISSION STATION AND RADIO COMMUNICATION NETWORK

TECHNICAL FIELD

The present invention relates to a radio transmission station and to a radio communication network.

BACKGROUND ART

In the field of radio communication, a MIMO (Multiple-Input and Multiple-Output) transmission scheme has been utilized, which realizes an improvement in the speed and quality of signal transmission by executing transmission and reception using multiple antennas on each of a radio transmission station side and a radio reception station side.

In order to further improve signal transmission speed and further reduce interference, a massive-MIMO transmission scheme has been considered, which uses a large number of antenna elements (e.g., 100 elements or more) in a high frequency band (e.g., 10 GHz or more) that enables antenna miniaturization and in which a wide bandwidth can be secured (e.g., Patent Document 1). For example, in a mobile communication system supporting UMTS (Universal Mobile Telecommunications System) LTE-A onward, the use of a Massive-MIMO transmission scheme is under consideration.

In massive-MIMO, advanced beamforming (BF) can be implemented that uses a greater number of antenna elements in comparison to conventional MIMO. Beamforming is a technology that involves controlling the directivity and shape of a beam (e.g., a transmission beam corresponding to a transmitting antenna, a reception beam corresponding to a receiving antenna) by controlling antenna elements. With MIMO, the phase and amplitude can be controlled for each antenna element, and therefore, the flexibility of beam control increases with an increase in the number of antenna elements that are used.

RELATED ART DOCUMENT

Patent Document

Patent Document 1: Japanese Patent Application Laid-Open Publication No. 2013-232741

SUMMARY OF THE INVENTION

Problem to be Solved by the Invention

In massive-MIMO, for each radio reception station, a radio transmission station forms a transmission beam directed to that radio reception station and transmits a signal addressed to that radio transmission station with the transmission beam, such that that radio reception station is able to receive the transmission beam. Each radio reception station needs to identify a beam suited to the radio reception station from among a multitude of beams that are emitted by the radio transmission station in various directions, and needs to report the suitable beam to the radio transmission station. In order to make it easy for the radio reception station to identify the suitable beam, the radio transmission station needs to transmit a signal with beams in various directions, the signal enabling the radio reception station to identify each beam with which the signal is transmitted. In other words, the radio transmission station needs to transmit a signal for the radio reception station to perform beam-search in various directions. Such identification of a suitable beam is performed, for example, when a mobile station establishes a connection to a base station that executes massive-MIMO, or when it is appropriate to do so in order for the mobile station to maintain or re-establish a connection to the base station.

In order to ensure that the radio reception station receives the signal for beam-search, the radio transmission station may use a very large amount of communication resources (which are defined by frequencies and times) to transmit the signal for beam-search in various directions. However, in a mobile communication system in which one base station communicates with many mobile stations, to achieve efficient data communication for many mobile stations, it is desirable that as much communication resources as possible be secured for data signal transmission. Moreover, the processing load will be great on the radio reception station to examine a very large amount of communication resources for performing beam-search.

In view of this, the present invention provides a radio transmission station and a radio communication network that each enable efficient data communication, and at the same time enable a signal used for beam-search by a radio reception station to be transmitted with an appropriate communication resource according to a radio channel state between the radio transmission station and the radio reception station.

Means of Solving the Problems

A radio transmission station according to the present invention includes: multiple transmitting antennas configured to convert electrical signals into radio waves and emit the radio waves; a beamformer configured to control directions of beams of the radio waves emitted from the transmitting antennas by giving beamforming weights to the electrical signals supplied to the transmitting antennas; a beam-discovery signal generator configured to generate a beam-discovery signal that enables a radio reception station, after the radio reception station receiving the beams, to identify the directions of the beams, and configured to supply the beam-discovery signal to the beamformer in order for the transmitting antennas to emit the beams corresponding to the beam-discovery signal in multiple directions; an arrangement pattern determiner configured to determine, based on at least one of the surroundings of the radio transmission station and a situation of the radio reception station, from among pre-prepared multiple candidates, an arrangement pattern with which multiple resource points to which the beam-discovery signal is mapped are arranged, the resource points being among communication resources, the resource points and the communication resources being defined by frequencies and times; a radio receiver configured to receive a signal from the radio reception station; and a weight determiner configured to determine, based on information that indicates a suitable direction among the directions of the beams corresponding to the beam-discovery signal, a suitable beamforming weight that is to be given in the beamformer to a data signal addressed to the radio reception station, the information being reported from the radio reception station and then received by the radio receiver.

A radio communication network according to the present invention includes a radio transmission station and an arrangement pattern determiner configured to communicate with the radio transmission station. The radio transmission station includes: multiple transmitting antennas configured to convert electrical signals into radio waves and emit the radio waves; a beamformer configured to control directions of beams of the radio waves emitted from the transmitting antennas by giving beamforming weights to the electrical signals supplied to the transmitting antennas; a beam-discovery signal generator configured to generate a beam-discovery signal that enables a radio reception station, after the radio reception station receiving the beams, to identify the directions of the beams, and configured to supply the beam-discovery signal to the beamformer in order for the transmitting antennas to emit the beams corresponding to the beam-discovery signal in multiple directions; a radio receiver configured to receive a signal from the radio reception station; and a weight determiner configured to determine, based on information that indicates a suitable direction among the directions of the beams corresponding to the beam-discovery signal, a suitable beamforming weight that is to be given in the beamformer to a data signal addressed to the radio reception station, the information being reported from the radio reception station and then received by the radio receiver. The arrangement pattern determiner is further configured to determine, based on at least one of the surroundings of the radio transmission station and a situation of the radio reception station, from among pre-prepared multiple candidates, an arrangement pattern with which multiple resource points to which the beam-discovery signal is mapped are arranged, the resource points being among communication resources, the resource points and the communication resources being defined by frequencies and times.

Effect of the Invention

In the present invention, the arrangement pattern of resource points to which there is mapped the beam-discovery signal used for beam-search by the radio reception station is determined based on at least one of the surroundings of the radio transmission station and the situation of the radio reception station. Accordingly, without a need for a very large number of resource points to transmit the beam-discovery signal, it is possible to transmit the beam-discovery signal using appropriate resource points according to the radio channel state between the radio transmission station and the radio reception station. Furthermore, since such an arrangement pattern is selected (determined) from among the pre-prepared candidates, it is possible to quickly determine an appropriate arrangement pattern according to the radio channel state between the radio transmission station and the radio reception station.

MODES FOR CARRYING OUT THE INVENTION

Hereinafter, various embodiments of the present invention will be described with reference to the accompanying drawings.

Massive-MIMO

A massive-MIMO transmission scheme according to embodiments of the present invention will be described. In massive-MIMO, in which a large number of transmitting antennas are used to perform radio communication, a high radio communication speed (a high data rate) is achieved by multiplexing. Moreover, more advanced beamforming compared with conventional beamforming is achieved because the flexibility in antenna control in performing beamforming is improved. Accordingly, reduction in interference and efficient usage of radio resources are achieved. Non-limiting examples of the number of transmitting antennas provided for a radio transmission station supporting massive-MIMO include 32 antennas or more, 100 antennas or more, and 1000 antennas or more.

With massive-MIMO, it is possible to effectively use a high frequency band (e.g., a frequency band at 10 GHz or higher). In a high frequency band, compared with a low frequency band, it is easier to secure radio resources with a wide bandwidth (e.g., 200 MHz or wider), which lead to high-speed communication. Moreover, since the size of a transmitting antenna is proportional to the wavelength of a signal, in a case where a high frequency band, in which radio signals have a short wavelength, is used, the size of a transmitting antenna can be further reduced. Since propagation loss increases as frequency becomes higher, even when the same transmission power is used by a base station to transmit a radio signal, the received signal strength at a mobile station will be lower in a case where a high frequency band is used, compared with a case where a low frequency band is used. However, this reduction in the received signal strength due to the use of a high frequency band can be compensated by a massive-MIMO beamforming gain.

Figure 1:
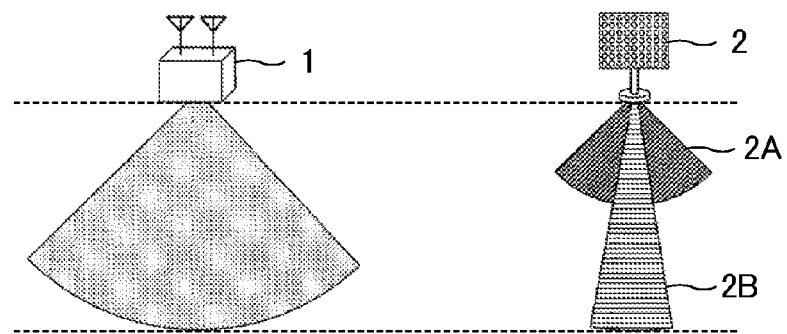
FIG. 1 is a diagram for schematically illustrating massive-MIMO.

FIG. 1 is a diagram schematically showing access ranges of beams (radio signals) varying depending on frequencies. A conventional base station 1 (e.g., a macro cell base station) uses a low frequency band to perform radio communication, and accordingly, is able to extend a beam with a wide-width radiation pattern to a great distance without performing massive-MIMO. A base station 2 that uses a high frequency band is unable to extend a beam 2A to a great distance when using a wide-width radiation pattern without performing massive-MIMO. However, when using a narrow-width radiation pattern with the use of massive-MIMO beamforming, the base station 2 is able to extend a beam 2B to a greater distance.

Figure 2:
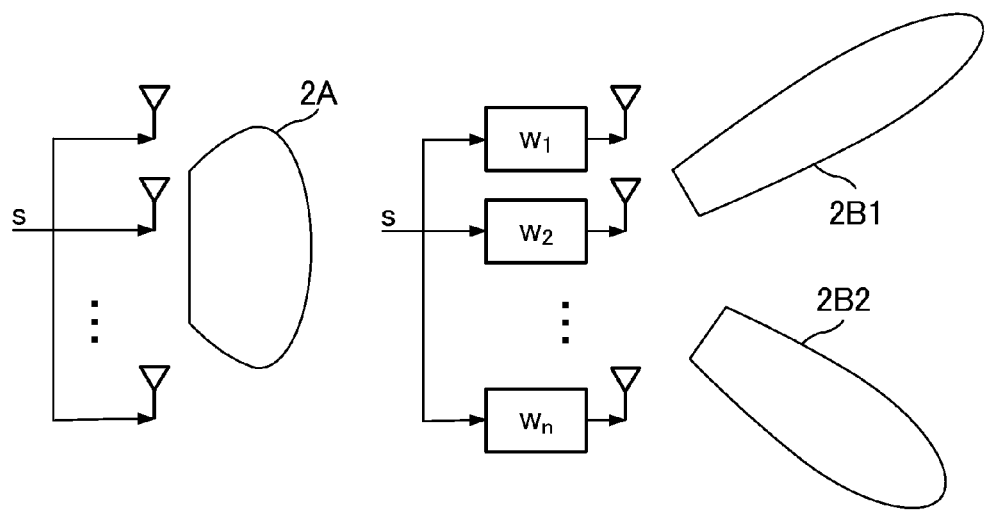
FIG. 2 is a diagram for describing an effect of beamforming with massive-MIMO.

Beamforming is a technology that gives directivity to a radio-wave beam by controlling the amplitudes and phases of radio waves with respect to multiple antennas. As shown in FIG. 2, when a transmission signal s is simply supplied to each of the antennas, a beam 2A that is emitted from these antennas has a wide width and does not reach a great distance. By giving, to a transmission signal s supplied to each antenna, a respective one of appropriate beamforming weights $w_1$ to $w_n$ (n being the number of antennas), one or more beams 2B1 and 2B2 with narrow widths are emitted from these antennas. The beams 2B1 and 2B2 reach a greater distance. It is possible to direct one or more transmission beams to each of multiple radio reception stations using the same frequency simultaneously. With an increase in the number of antennas, the number of beams will increase, the width of the beams will be narrower, and more precise control over the directions of the beams will be attained. The narrower the width of the beams, the higher the gain that will be obtained (i.e., the higher the power with which a radio reception station receives a signal will be).

Figure 3:
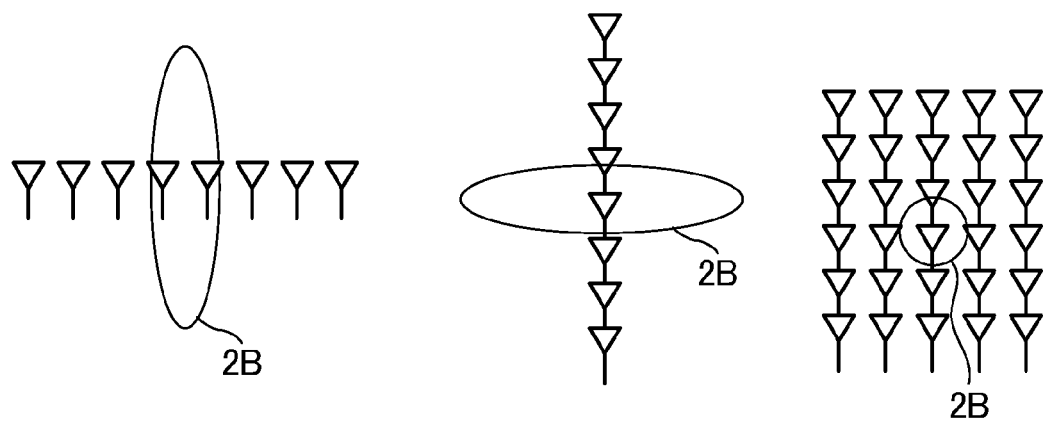
FIG. 3 is a diagram for illustrating shapes of beams formed by beamforming with massive-MIMO.

As shown in FIG. 3, the shape of a beam 2B formed by beamforming is restricted by the antenna arrangement. FIG. 3 shows cross-sectional surfaces of beams 2B, the surfaces being parallel to the plane of paper. Naturally, the shapes of the actual beams 2B are three-dimensional. When the antennas are arranged in a horizontal line, a beam 2B with a cross-section that is long in the vertical direction and is short in the horizontal direction is formed. When the antennas are arranged in a vertical line, a beam 2B with a cross-section that is long in the horizontal direction and is short in the vertical direction is formed. When the antennas are arranged in lines in the horizontal and vertical directions, a beam 2B with a cross-section that is narrow in the horizontal and vertical directions is formed.

Beamforming is used not only for forming a transmission beam in the radio transmission station, but also for forming a reception beam by giving a weight to a signal received by an receiving antenna in the radio reception station. Beamforming in the radio transmission station is referred to as "transmission beamforming", and beamforming in the radio reception station is referred to as "reception beamforming".

Heterogeneous Network

Figure 4:
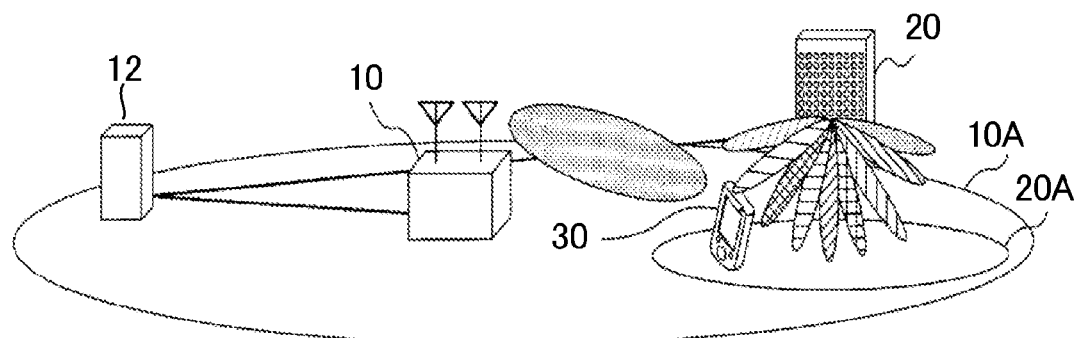
FIG. 4 is a schematic diagram illustrating a heterogeneous network in which a small cell base station in which massive-MIMO is used is disposed.

FIG. 4 shows an example disposition of a base station in which massive-MIMO is used. A radio communication network shown in FIG. 4 includes a macro cell base station 10, a central control station (mobility management entity (MME)) 12, and a small cell base station 20. The macro cell base station 10 and the small cell base station 20 each communicate with a user device (mobile station or user equipment (UE)) 30. Although only a single user device 30 is depicted in FIG. 4, each base station communicates with many user devices 30.

Although the macro cell base station 10 does not utilize massive-MIMO, the macro cell base station 10 uses a low frequency band (e.g., 2 GHz band), and thus, radio waves emitted from the macro cell base station 10 reach a great distance. In FIG. 4, reference sign 10A indicates a macro cell area of the macro cell base station 10. Since the macro cell base station 10 has wide coverage, it has a stable connection to the user device 30.

The small cell base station 20 uses a high frequency band (e.g., 10 GHz band). Although the small cell base station 20 utilizes massive-MIMO, the access range of radio waves emitted from the small cell base station 20 (a small cell area 20A of the small cell base station 20) is narrower than the macro cell area 10A. Accordingly, the small cell base station 20 and the user device 30 are likely to be connected by a line-of-sight connection, and in such a case, a radio channel between the small cell base station 20 and the user device 30 is likely to be of low frequency selectivity. The small cell base station 20 uses a wide bandwidth (e.g., 200 MHz or wider) and is suited for high-speed communication.

The small cell base station 20 is disposed such that the small cell area 20A overlaps with the macro cell area 10A.

Having entered the small cell area 20A, the user device 30 communicates with the small cell base station 20. The small cell base station 20 is typically disposed in a hotspot where many user devices 30 are present, and thus, large amounts of traffic are expected. Although FIG. 4 depicts only a single small cell base station 20, many small cell base stations 20 may be disposed in the macro cell area 10A. As described above, the depicted network is a heterogeneous network in which various types of base stations with varying coverage are present.

The user device 30 has a function to support multiple connectivity, which enables the user device 30 to communicate with multiple base stations simultaneously. Typically, after the user device 30 enters the small cell area 20A, the small cell base station 20 performs data communication with the user device 30 by taking advantage of high-speed communication resulting from the use of a wide bandwidth, whereas the macro cell base station 10 maintains the connection to the user device 30 to transmit a control signal to the user device 30 and to receive from the user device 30 a signal necessary for the user device 30 to connect to the small cell base station 20. In this case, the macro cell base station 10 serves to maintain connectivity of the user device 30 to the radio communication network and maintain mobility of the user device 30. In other words, the small cell base station 20 handles a user plane (U-plane) and the macro cell base station 10 handles a control plane (C-plane). In addition to communicating data with the user device 30, the small cell base station 20 may exchange with the user device 30 some control signals that are required for communicating data. The macro cell base station 10 and the small cell base station 20 share upper-level control information.

The macro cell base station 10 supplies to the small cell base station 20 information (side-information) that is required for the user device 30 that has entered the small cell area 20A to communicate with the small cell base station 20. Such a support by the macro cell base station 10 for communication between the user device 30 and the small cell base station 20 is described as "macro-assisted" or "network-assisted". In the example in FIG. 4, the small cell base station 20 and the macro cell base station 10 are each connected to a central control station 12, and the central control station 12 relays information between these two nodes. The small cell base station 20 and the macro cell base station 10 may be directly connected to each other.

In this network, OFDMA (Orthogonal Frequency Division Multiple Access) is used for the downlink radio communication, and SC-FDMA (Single Carrier-Frequency Division Multiple Access) is used for the uplink radio communication. The downlink radio communication performed by the small cell base station 20 benefits from multiplexing in OFDMA and also from spatial multiplexing in MIMO.

In the example shown in FIG. 4, the macro cell base station 10 and the small cell base station 20 use the same radio access technology (RAT). For example, the macro cell base station 10 and the small cell base station 20 may perform communication in compliance with LTE-A or subsequent 3GPP (Third Generation Partnership Project) standards. Alternatively, the macro cell base station 10 and the small cell base station 20 may use different RAT. For example, either the macro cell base station 10 or the small cell base station 20 may perform communication in compliance with wireless LAN standards, such as WiFi (registered trademark).

In the following, embodiments of the present invention will be described using an example in which the small cell base station 20 serves as a radio transmission station and the user device 30 serves as a radio reception station. It is noted that the radio transmission station according to the present invention is not limited to the small cell base station 20. The radio transmission station may be any other communication device that has a mechanism to control multiple transmitting antennas and to control directions of radio-wave beams emitted from these transmitting antennas.

Operations of User Device to Communicate with Small Cell Base Station

Figure 5:
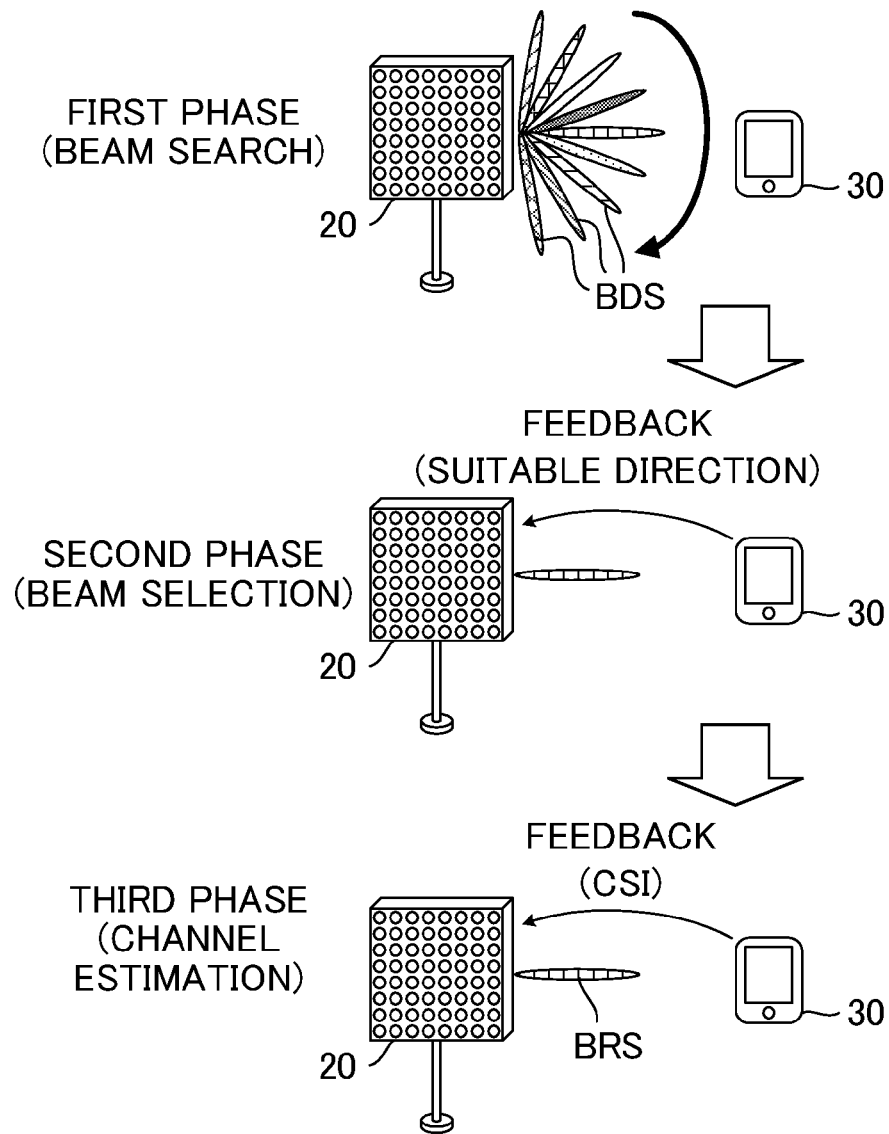
FIG. 5 is a diagram schematically illustrating operational phases for a user device to communicate with the small cell base station.

FIG. 5 schematically illustrates operations of the user device 30 to communicate with the small cell base station 20. Since the small cell base station 20 forms a narrow-width beam with massive-MIMO, the small cell base station 20 needs to identify a beam suited to communication with the user device 30 (more specifically, needs to identify a beamforming weight used to direct a beam to an appropriate direction). Once having identified the beamforming weight suited to communication with the user device 30, the small cell base station 20 needs to obtain a channel quality estimation result in which that beamforming weight is reflected. Using the channel quality estimation result, the small cell base station 20 controls various parameters used in communication with the user device 30. The user device 30 executes the operations shown in FIG. 5 in a process in which the user device 30 initially establishes a connection to the small cell base station 20, and also in order to maintain or re-establish the connection to the small cell base station 20 if the user device 30 is mobile. For example, after the process of the initial connection establishment, the operations shown in FIG. 5 by the user device 30 may be executed periodically, or may be executed when the user device 30 is moving at a speed greater than a predetermined speed, or after the user device 30 has moved a distance greater than a predetermined distance, or when the user device 30 has lost the connection to the small cell base station 20.

In the first phase, the small cell base station 20 emits beams in various directions, changing between candidate beamforming weights. The candidate beamforming weights are stored in a database in the small cell base station 20 in advance. The user device 30 measures the received power of each beam in order to identify at least one suitable beam. In other words, the user device 30 performs beam-search. A signal on which beamforming is performed for beam-search is referred to as a "beam-discovery signal" (BDS). The user device 30 needs to detect reception of beams corresponding to the beam-discovery signal by their received powers and to identify the direction of each received beam. Identification of each beam is accomplished by non-coherent detection (e.g., delay detection, correlation detection, power detection). For example, if correspondence between the direction of each beam and the time slot in which that beam is emitted is determined beforehand, by the user device 30 identifying in which time slot there was an increase in received power, it is possible to identify the direction and the received power of a received beam. Alternatively, if correspondence between the direction of each beam and the frequency of that beam is determined beforehand, by the user device 30 identifying at which frequency there was an increase in received power, it is possible to identify the direction and the received power of a received beam.

Preferably, the BDS plays the same role as a synchronization signal. In other words, the user device 30 recognizes the cell ID (physical cell ID (PCI)), which is an identifier, of the small cell base station 20 using the BDS, and achieves timing synchronization with the small cell base station 20. Beam-search is the same as conventional cell-search in this regard. Additionally, as described above, the user device 30 identifies a suitable beam-direction in beam-search.

In the second phase, the user device 30 selects the single most suitable beam (e.g., the beam with the highest received power) based on the measurement result of the received power of each beam, and feeds back information that indicates the selection result to the small cell base station 20. Alternatively, the user device 30 may select some suitable beams (e.g., beams with best received powers), and may feed back information that indicates the rankings of the selected beams to the small cell base station 20. Either way, the fed-back information is information that indicates a suitable direction of a beam corresponding to the beam-discovery signal. In a process in which the user device 30 that is not connected to the small cell base station 20 initially establishes a connection, the feedback of the suitable direction is preferably performed in a network-assisted manner. In other words, the user device 30 preferably transmits the information to the macro cell base station 10 to which the user device 30 is connected, and then the macro cell base station 10 preferably forwards that information to the small cell base station 20.

Based on the information that is fed back from the user device 30 and indicates the suitable beam-direction, the small cell base station 20 determines a set of suitable beamforming weights that are to be used for communication with the user device 30. In a case where the user device 30 feeds back information that indicates one direction that is the most suitable, the small cell base station 20 determines the set of suitable beamforming weights according to that most suitable direction. In a case where the user device 30 feeds back information that indicates the rankings of some suitable directions, the small cell base station 20 determines the set of suitable beamforming weights according to those suitable directions. In this case, it is possible to determine the set of suitable beamforming weights in view of the state of beam-direction usage for multiple user devices 30. For example, if the direction most suited to the user device 30 is already in use for many other user devices, a set of suitable beamforming weights that correspond to the second best direction (the second most suitable direction) for the user device 30 may be selected for that user device 30.

In a case where downlink transmission to the user device 30 is performed using multiple ranks (multiple streams), the small cell base station 20 forms multiple beams corresponding to the multiple ranks. In a case where the user device 30 feeds back the information that indicates the rankings of some suitable directions, the small cell base station 20 selects for that user device 30 sets of suitable beamforming weights, the sets corresponding to those directions suited to that user device 30.

In the third phase, the small cell base station 20 transmits a reference signal with a beam of at least one suitable direction, the reference signal enabling the user device 30 to estimate a channel state corresponding to the suitable direction for the user device 30. More specifically, the small cell base station 20 transmits to the user device 30 the reference signal whose direction is controlled with at least one determined set of suitable beamforming weights. Since beamforming is performed on this reference signal, this reference signal may be referred to as a "beamformed reference signal" or a "beam reference signal" (BRS).

Based on the reception result of the beam reference signal, the user device 30 estimates and determines a channel state that corresponds to the at least one suitable direction, and feeds back the determined channel state information (CSI) to the small cell base station 20. According to the CSI fed back from the user device 30, the small cell base station 20 determines downlink data transmission parameters suited to the user device 30. The small cell base station 20 may use the CSI fed back from the user device 30 as the downlink data transmission parameters for that user device 30. The CSI fed back from the user device may be a set of a channel quality indicator (CQI), precoding matrix indicator (PMI), and a rank indicator (RI). Then, the small cell base station 20 uses the data transmission parameters determined based on the CSI to transmit a downlink data signal addressed to the user device 30.

The small cell base station 20 uses the set of suitable beamforming weights for transmitting the BDS and the downlink data signal addressed to the user device 30. In other words, the small cell base station 20 transmits the BDS with a beam with the same direction as the suitable direction used for transmitting the data signal. This is for the purpose of determining the data transmission parameters that are suited to data signal transmission.

In the process in which the user device 30 which is not connected to the small cell base station 20 initially establishes a connection, the feedback of the CSI may be performed in a network-assisted manner. Alternatively, since the small cell base station 20 knows the suitable direction for the user device 30, if the small cell base station 20 performs reception beamforming on an uplink signal to adjust the direction of reception sensitivity to the direction of the user device 30, the small cell base station 20 is able to receive a radio signal from the user device 30. Accordingly, the user device 30 may feed back the CSI to the small cell base station 20 directly.

Without performing the first and second phases, the small cell base station 20 may determine the at least one set of suitable beamforming weights to be used for communication with the user device 30 based on the location of the user device 30, the location being notified by the macro cell base station 10. In a case where the user device 30 uses its positioning function that uses the Global Positioning System (GPS) or any other positioning system, the user device 30 will be able to transmit its location information to the macro cell base station 10, and the macro cell base station 10 will be able to forward the location information to the small cell base station 20. In a case where the user device 30 fails to receive the beam-discovery signal (BDS), the small cell base station 20 may determine the at least one set of suitable beamforming weights to be used for communication with the user device 30 based on the location of the user device 30.

Beam-Direction Control in Small Cell Base Station

Figure 6:
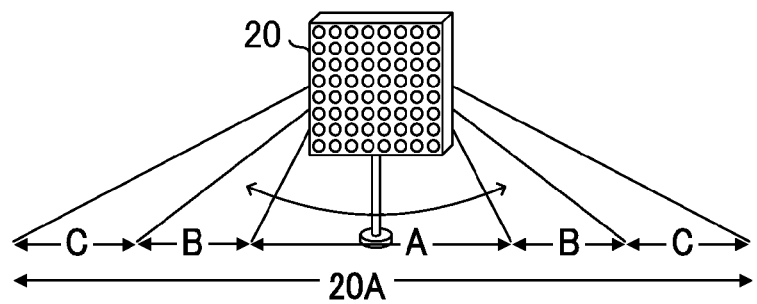
FIG. 6 is a diagram showing depression angles of beams that can be controlled by the small cell base station with massive-MIMO.
Figure 7:
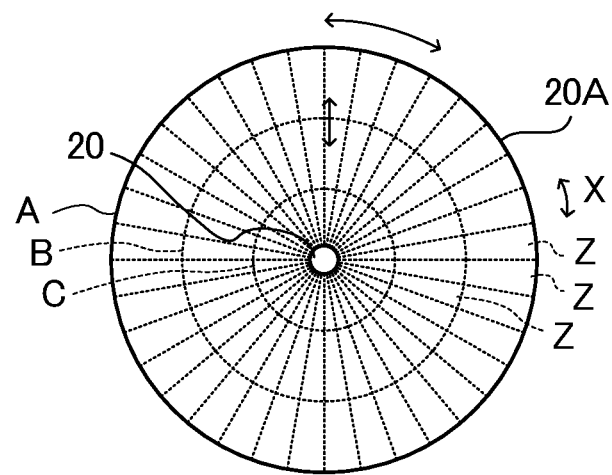
FIG. 7 is a diagram showing zones resulting from the depression angles and azimuth angles of beams that can be controlled by the small cell base station with massive-MIMO.

With reference to FIGS. 6 and 7, beam-direction control in transmission beamforming by the small cell base station 20 will be described. FIG. 6 shows a front view of the small cell base station 20, and FIG. 7 shows a plan view of the small cell base station 20. The small cell base station 20 is able to control the depression angle (downward angle) of a beam, and is able to control the azimuth angle (horizontal-plane angle) of the beam. In the illustrated example, the beam depression angle can be controlled in three levels, and the small cell area 20A is divided into three ranges A, B, and C, according to the beam depression angle. The beam azimuth angle can be controlled every 10 degrees, in 36 levels. Accordingly, in the illustrated example, the small cell area 20A is divided into 108 zones Z that each have the azimuth angle X (10 degrees) and are fan-shaped or nearly square-shaped. Each zone Z corresponds to one transmission beam that is formed by transmission beamforming. Thus, the small cell base station 20 is able to transmit 108 beams.

In the illustrated example, the BDS is transmitted with 108 beams. In beam-search, time-division transmission and frequency-division transmission can be used. In time-division transmission, the small cell base station 20 uses 108 sets of beamforming weights, one set at a time, in accordance with the 108 zones Z, to emit 108 beams one after another. In other words, the beams emitted vary for different time slots. In frequency-division transmission, the small cell base station 20 emits 108 beams at the same time using 108 different frequencies.

Figure 8:
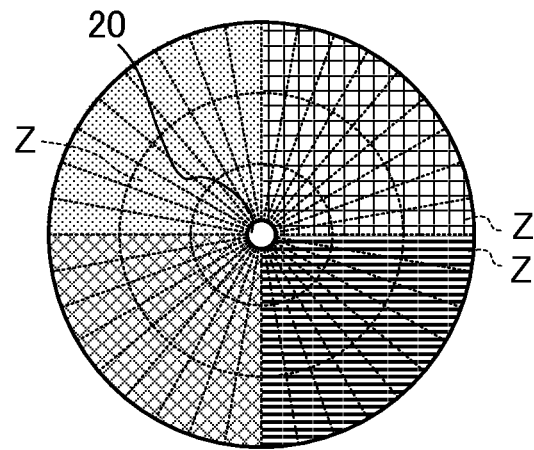
FIG. 8 is a diagram for describing time-division transmission and frequency-division transmission of beams by the small cell base station for beam-search.

Time-division transmission and frequency-division transmission may be combined. For example, in the example shown in FIG. 8, the small cell base station 20 simultaneously emits multiple beams that correspond to multiple zones Z with the same coloring pattern. Frequencies of the beams emitted simultaneously (each beam corresponding to one zone Z) are different from one another (frequency-division transmission). The small cell base station 20 emits beams that correspond to zones in groups with different coloring patterns in different time slots (time-division transmission). The user device 30 is able to identify the direction of a suitable beam by identifying the time slot and frequency in which the received power has increased.

Figure 9:
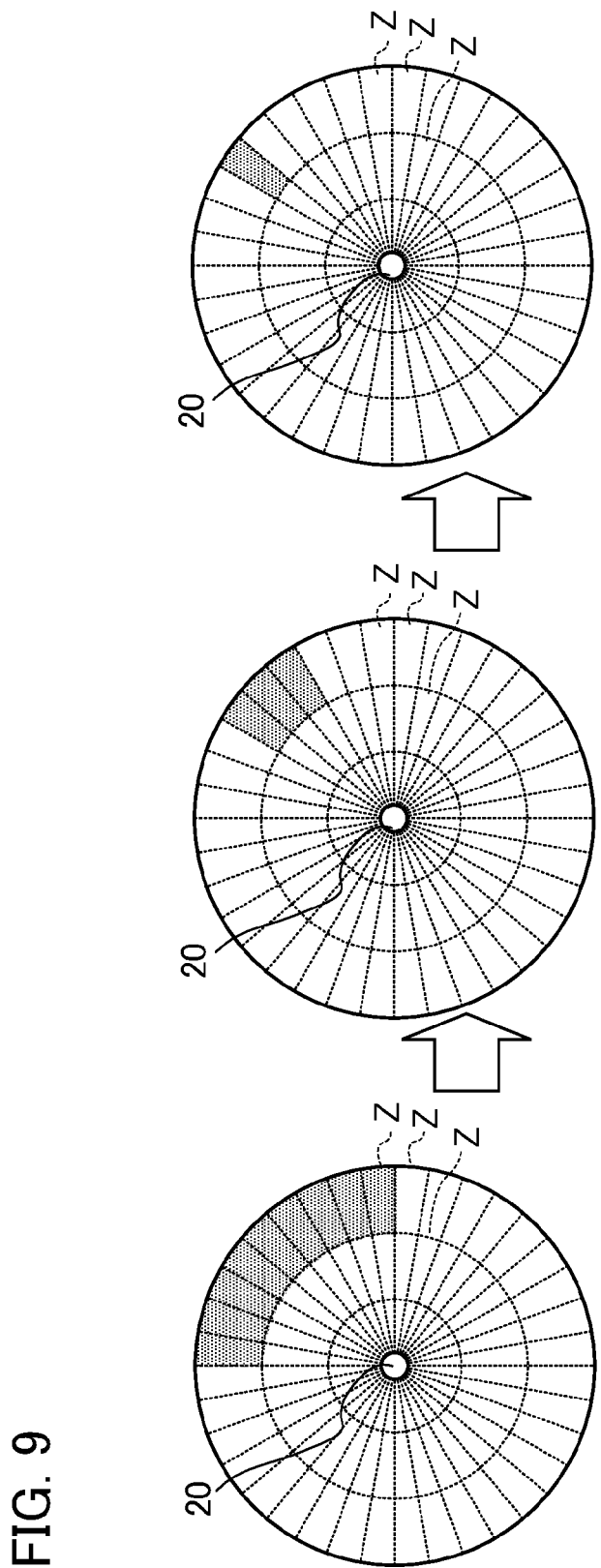
FIG. 9 is a diagram for describing stepwise beam-search.

In time-division transmission, the small cell base station 20 may perform stepwise beam-search. For example, as shown in FIG. 9, in the first time slot, the small cell base station 20 simultaneously emits beams that correspond to a wide-range combination of zones Z (in the example of FIG. 9, nine zones Z forming 90 degrees). In a case where the user device 30 cannot receive these beams or the received powers of these beams are extremely low, the user device 30 either does not feed back information to the small cell base station 20 or feeds back information that indicates that the received powers are extremely low. In this case, in the next time slot, the small cell base station 20 simultaneously emits beams that correspond to a combination of different zones Z (in the example of FIG. 9, nine zones Z), and wait for a response from the user device 30.

In a case where the user device 30 receives any of the beams with high received power, the user device 30 feeds back to the small cell base station 20 information that indicates that the received power was high. In this case, the small cell base station 20 then simultaneously transmits beams that correspond to a narrow-range combination of zones Z (in the example shown in FIG. 9, three zones Z forming 30 degrees) that are included in, but are smaller in the number than, the zones Z within the 90 degrees. In a case where the user device 30 cannot receive these beams or the received powers of these beams are extremely low, in the next time slot the small cell base station 20 simultaneously emits beams that correspond to a combination of different zones Z (in the example of FIG. 9, three zones Z), and wait for a response from the user device 30.

In a case where the user device 30 receives any of the beams with high received power, the user device 30 feeds back to the small cell base station 20 information that indicates that the received power was high. In this case, the small cell base station 20 then individually transmits beams corresponding to those zones Z within the 30 degrees one by one, each beam in a different time slot. In this way, the user device 30 is eventually able to identify at least one suitable beam-direction (corresponding to at least one zone Z). Although the suitable beam-direction is identified in three steps in the example of FIG. 9, the number of steps may be two, four, or more. The number of zones Z that constitute a combination of zones Z is not limited to the examples of FIG. 9.

Radio Transmission Format Suited to Massive-MIMO

Figure 10:
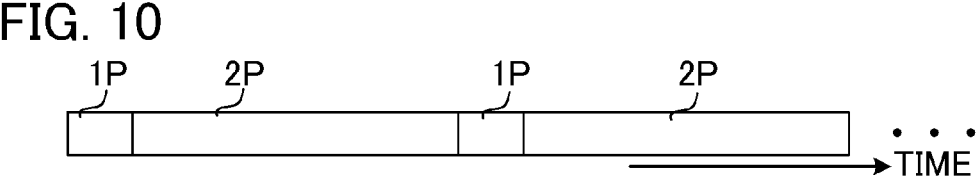
FIG. 10 is a diagram showing a format for downlink radio transmission used in the small cell base station.

FIG. 10 shows a format for downlink radio transmission used in the small cell base station 20. The duration of downlink transmission in the small cell base station 20 is divided into a first period 1P and a second period 2P, each being repeated periodically. The first period 1P and the second period 2P each have a certain length of duration. The length of duration of the first period 1P may be the same as, or may be different from, the length of a radio frame in LTE-A (10 ms). The length of duration of the second period 2P may be the same as, or may be different from, the length of a radio frame in LTE-A. Preferably, the second period 2P is longer than the first period 1P.

Figure 11:
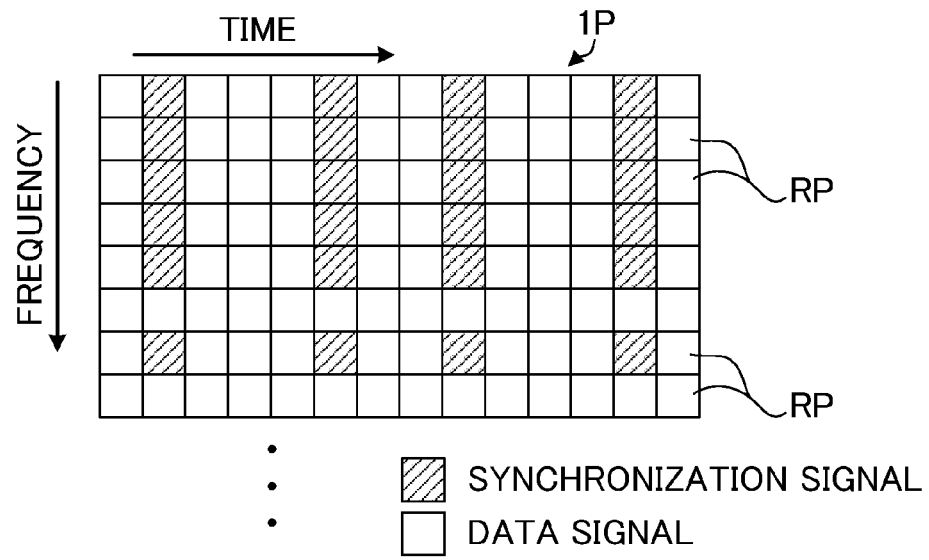
FIG. 11 is a diagram showing an example arrangement format of signals in the first period shown in FIG. 10.

FIG. 11 shows an example arrangement format of signals in the first period 1P. Each square in the figure is a point that is defined by a frequency and a time, and is hereinafter referred to as a resource point RP. In the following description, the unit of the frequency direction in the figure is referred to as a "frequency point", and the unit of the time direction is referred to as a "time point".

A resource point RP may be a resource element or a resource block in LTE-A, or may be something else. In other words, the number of symbols that constitute a resource point RP (the length of a time point) is fixed and the number of subcarriers that constitute a resource point RP (the number of subcarriers in a frequency point) is fixed, but the number of symbols and the number of subcarriers that constitute a resource point RP may be any numbers. The length of a time point may be the same as, or may be different from, a transmission time interval (TTI) in LTE-A.

As shown in FIG. 11, in the first period 1P, the small cell base station 20 transmits data signals and synchronization signals. The data signals are addressed to at least one user device that has established a connection to the small cell base station 20. Taking advantage of spatial multiplexing in massive-MIMO, data signals addressed to multiple user devices may use the same resource point RP.

In the first period 1P, resource points RP for the synchronization signals are arranged in a regular pattern. The user device 30 recognizes the cell ID, which is an identifier, of the small cell base station 20 using the synchronization signals, and achieves timing synchronization with the small cell base station 20. In this regard, the first period 1P is provided for conventional cell-search.

In a case where the user device fails to receive a BDS transmitted during the second period 2P, which will be described later, the user device recognizes the cell ID of the small cell base station 20 using the synchronization signals transmitted during the first period 1P, and achieves timing synchronization with the small cell base station 20. Then, the user device transmits its location information to the macro cell base station 10, and the macro cell base station 10 forwards the location information to the small cell base station 20. The small cell base station 20 determines at least one set of suitable beamforming weights to be used for communication with the user device based on the location of the user device, the location having been notified by the macro cell base station 10. The small cell base station 20 uses the suitable beamforming weights for transmitting the BDS and downlink data signals addressed to the user device.

For this purpose, the synchronization signals should be received by many of the user devices that are present in the small cell area 20A of the small cell base station 20 (even if some user devices are located far from the small cell base station 20). In view of this, the synchronization signals are not subjected to beamforming, and they are emitted in every direction in which the antennas of the small cell base station 20 can emit. The synchronization signals are arranged in many frequency points to improve current density, so that the high-frequency synchronization signals emitted in various directions could reach remote locations.

Figure 12:
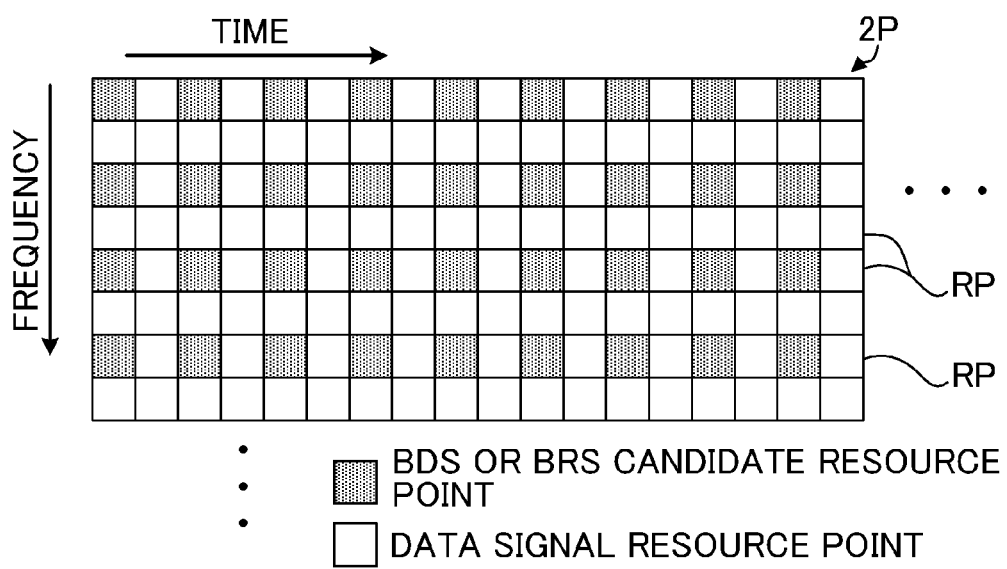
FIG. 12 is a diagram showing an example arrangement format of signals in the second period shown in FIG. 10.

As shown in FIG. 12, in the second period 2P, the small cell base station 20 transmits data signals, BDSs, and BRSs. The data signals are addressed to at least one user device that has established a connection to the small cell base station 20. Taking advantage of spatial multiplexing in massive-MIMO, data signals addressed to multiple user devices may use the same resource point RP.

The colored parts in FIG. 12 show candidate resource points (to-be-examined resource points) that can be candidates for BDSs or BRSs. As shown for example in FIG. 13 or in FIG. 14, the BDSs and the BRSs are arranged in some of the candidate resource points. The candidate resource points are used by the user device 30, which is the radio reception station, to examine whether the BDSs and the BRSs are included in these resource points. Regardless of whether the BDSs and the BRSs are arranged in the example arrangement pattern of FIG. 13 or in that of FIG. 14, BDS resource points and BRS resource points are always included in the candidate resource points. Thus, without knowing the arrangement pattern of the BDS resource points and the BRS resource points, the user device 30 is able to recognize the BDSs and the BRSs. The arrangement pattern of the candidate resource points is preferably configured as a system parameter.

Figure 13:
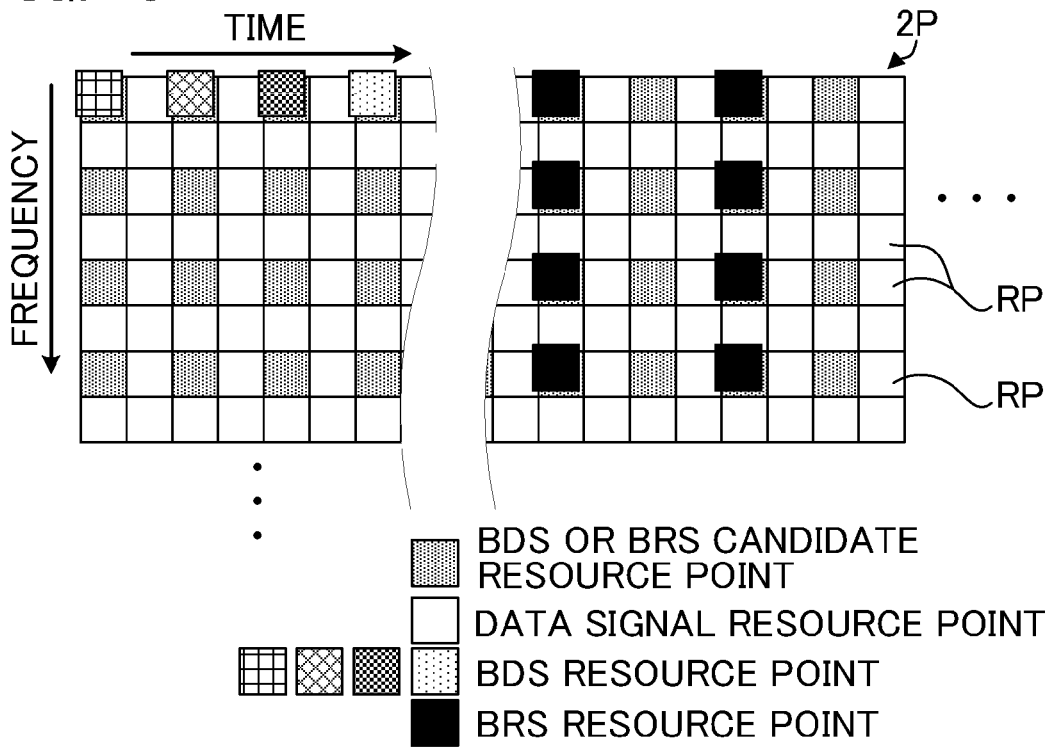
FIG. 13 is a diagram showing an example arrangement pattern of beam-discovery signals (BDSs) and beam reference signals (BRSs).
Figure 14:
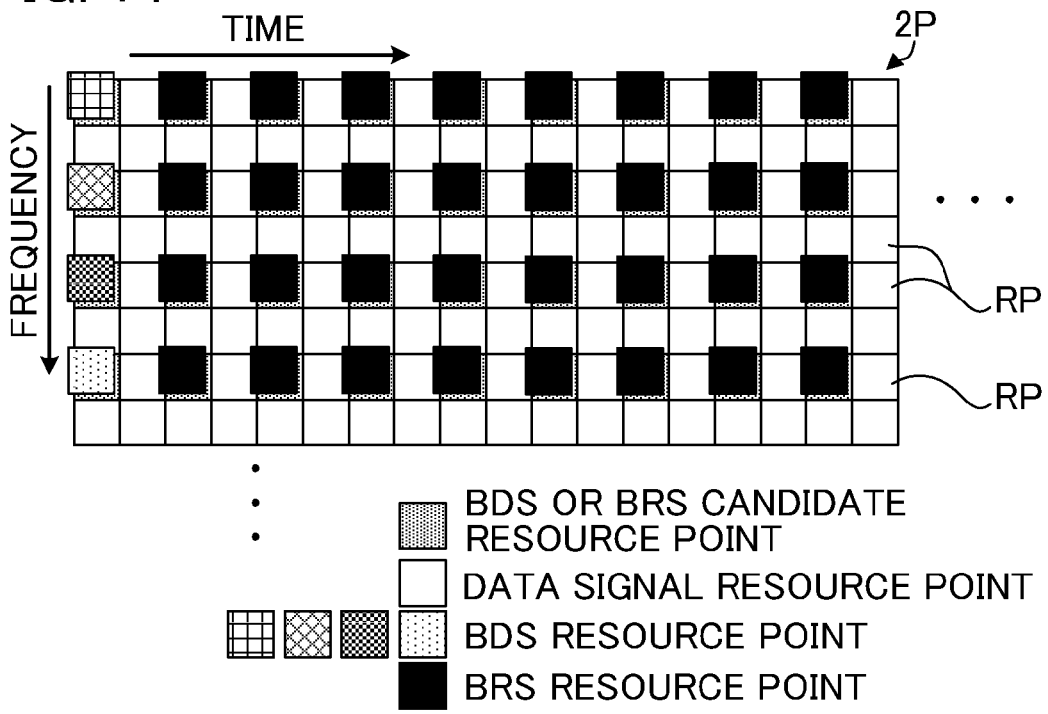
FIG. 14 is a diagram showing another example arrangement pattern of the BDSs and the BRSs.
Figure 15:
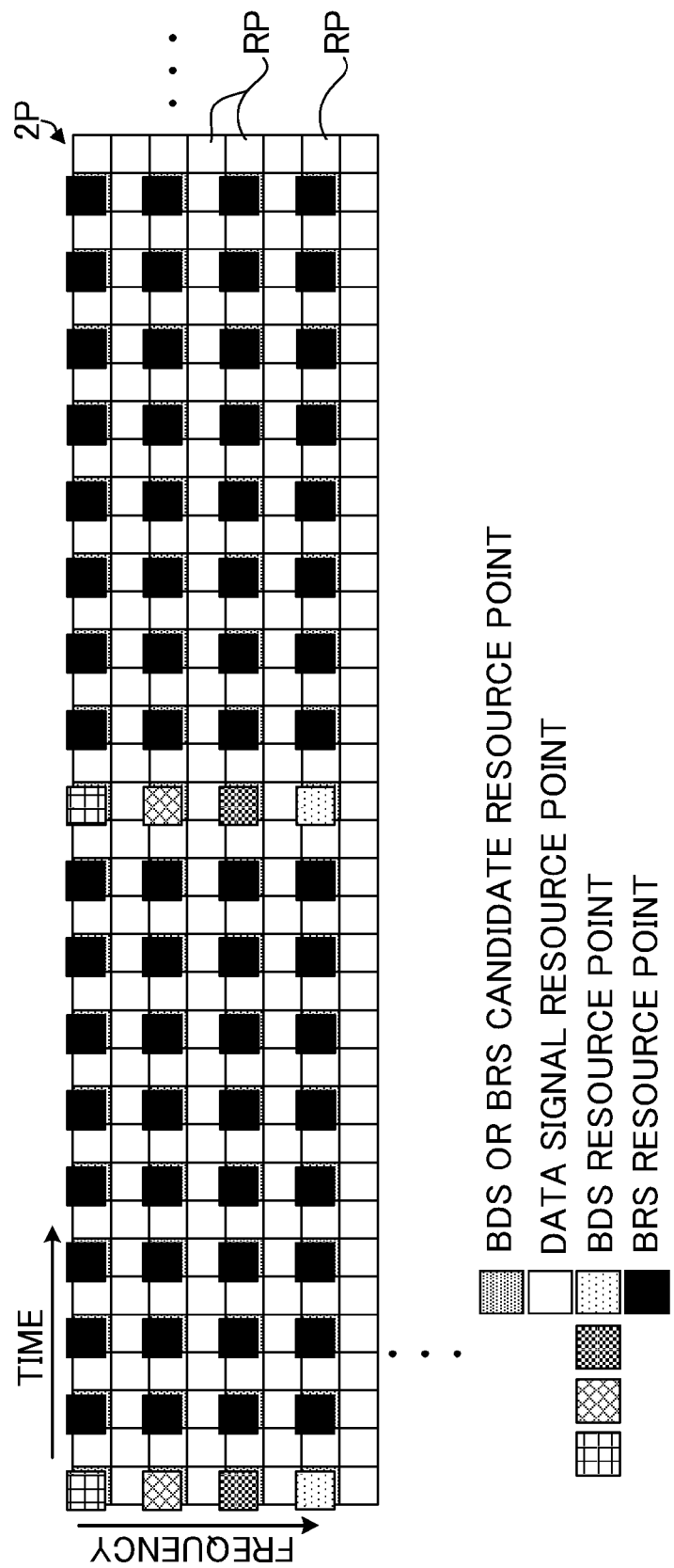
FIG. 15 is a diagram showing an example arrangement pattern in the second period.

FIGS. 13 and 14 each show a portion of the second period 2P. As shown in FIG. 15, in the second period 2P, the arrangement pattern of the BDSs and the BRSs shown in FIG. 13 or in FIG. 14 is repeated along the time-axis. Alternatively, the arrangement pattern of the BDSs and the BRSs shown in FIG. 13 or FIG. 14 may be placed only at the beginning of the second period 2P, and later on all the resource points RP may be used for transmitting data signals.

First Embodiment

If many resource points RP are used for transmitting BDSs, the certainty that the user device 30 will receive the BDSs increases, and if many resource points RP are used for transmitting BRSs, the certainty that the user device 30 will receive the BRSs increases. However, when there are many BDS resource points, to which BDSs are mapped, and many BRS resource points, to which BRSs are mapped, the number of resource points RP to which data signals are mapped will decrease by the number of the resource points RP allocated to the BDSs and the BRSs. Since the BDSs and the BRSs are subjected to beamforming and the directions thereof are set, taking advantage of spatial multiplexing in massive-MIMO, data signals may be transmitted for user devices that are located in a different direction using the BDS resource points and the BRS resource points. However, in a case where there are many user devices 30 accessing the small cell base station 20, an increase in the number of BDS resource points and in that of BRS resource points may lead to a shortage of resources for data signals. Moreover, the processing load will be great on the user device 30, which is the radio reception station, to examine a large number of BDS resource points for performing beam-search.

Depending on the state of a radio channel between the small cell base station 20 and the user device 30, there must be an appropriate arrangement pattern of the BDS resource points and the BRS resource points. For example, when temporal variation in the radio channel is large, the BDSs are preferably transmitted in a short time, whereas when frequency selectivity of the radio channel is high, the BRSs are preferably transmitted using many frequency points.

Accordingly, the small cell base station 20 should transmit the BDSs and the BRSs using communication resources as appropriate as possible such that the resource usage is adapted to a predicted state of the radio channel between the small cell base station 20 and the user device 30. The small cell base station 20, however, does not know the channel state at the time of the process in which the BDSs and BRSs are utilized by the user device, particularly at the time of the process of initial connection establishment.

In the first embodiment of the present invention, based on an indicator that indicates the surroundings of the small cell base station 20, the small cell base station 20 determines the arrangement pattern of the BDS resource points and the BRS resource points, among communication resources defined by frequencies and times. The state of the radio channel between the small cell base station 20 and the user device 30 depends on the surroundings of the small cell base station 20. For example, at a platform in a station where trains arrive and depart frequently, temporal variation in a radio channel is great due to radio-wave interference caused by the trains. At a location where many people are walking at a quick pace, the user of the user device 30 is also likely to be walking at a quick pace, and accordingly temporal variation in a radio channel will likely to be great. In a region where obstacles such as buildings are crowded together, the frequency selectivity of a radio channel is high. Thus, the following may serve as an indicator that indicates the surroundings: the number of moving objects and the speeds thereof; the number of moving people and the speeds thereof; the number of static obstacles and the sizes thereof; or a combination of the above. The indicator that indicates the surroundings of the small cell base station 20 is not as accurate as the CSI, but it does reflect the state of the radio channel to some degree.

The small cell base station 20 acquires information related to the surroundings of the small cell base station 20 and based on that information calculates the indicator related to the surroundings, and determines the arrangement pattern based on that indicator related to the surroundings. For example, the small cell base station 20 may have an analyzer that analyzes an image that is taken by at least one camera, and may determine the arrangement pattern based on its analysis result. The image to be analyzed may be a still image or may be a moving image. The small cell base station 20 may have at least one optical sensor, and may determine the arrangement pattern based on its analysis result. Since the coverage of the small cell base station 20 is small, the information indicating the surroundings can probably be acquired with a small number of measurement devices.

The small cell base station 20 may determine the arrangement pattern based on information that is supplied by multiple user devices 30 that are connected to the small cell base station 20. For example, such supplied information may be information of the speed of each user device 30, location information of each user device 30, or information of a moving image taken by a camera of each user device 30. In a case where the location information or the moving image information is supplied, the small cell base station 20 may calculate the speeds of these user devices based on the supplied information, and based on the calculation results, may determine the arrangement pattern. As described above, the walking speeds of many users are thought to have an effect on the radio channel state for any one user device.

The small cell base station 20 may refer to a database that stores past radio channel states related to the small cell base station 20 or other past indicators related to the surroundings, and may determine the arrangement pattern based on those records. The small cell base station 20 may determine the arrangement pattern by referring to information or an indicator supplied by another node in the network, such as the macro cell base station 10, the information being related to, or the indicator being indicative of, the surroundings of the small cell base station 20.

Alternatively, the small cell base station 20 may calculate an indicator indicative of the surroundings based on any or all of the abovementioned various information to determine the arrangement pattern.

From the indicator indicative of the surroundings, the small cell base station 20 determines whether the temporal variation in the radio channel is greater than a threshold value, and based on the determination result, selects the arrangement pattern of the BDS resource points and the BRS resource points from multiple candidates. FIGS. 13 and 14 show two candidates for the arrangement pattern. As shown in FIGS. 13 and 14, in these candidate arrangement patterns, candidate resource points are common to the BDSs and the BRSs. The BDS resource points, to which the BDSs are mapped, and the BRS resource points, to which the BRSs are mapped, are each arranged in a portion of the candidate resource points. The BDS resource points vary between the candidate arrangement patterns, and the BRS resource points vary between the candidate arrangement patterns.

In the figures, the differences in the coloring patterns of the BDS resource points indicate differences in beam-directions (i.e., beamforming is performed on the BDSs using different sets of beamforming weights). Beamforming is also performed on the BRSs, but the BRS resource points are common to all the user devices 30 that are connected to the small cell base station 20. Accordingly, the BRS resource points are simply shown in black.

The arrangement pattern shown in FIG. 13 is suited to a radio channel with small temporal variation, and the arrangement pattern shown in FIG. 14 is suited to a radio channel with large temporal variation. For the radio channel with small temporal variation, it is preferable that the user device 30 accurately identify the suitable beam-direction, even if this takes some time. For the radio channel with large temporal variation, it is preferable that the user device 30 identify the suitable beam-direction in a short period of time. Thus, the BDSs are arranged along the time direction in the arrangement pattern shown in FIG. 13, and the BDSs are arranged along the frequency direction in the arrangement pattern shown in FIG. 14. When the arrangement pattern of FIG. 13 is selected, the small cell base station 20 emits beams by the above-described time-division transmission, using the same frequency point over multiple time points. When the arrangement pattern of FIG. 14 is selected, the small cell base station 20 emits beams by the above-described frequency-division transmission, using the same time point over multiple frequency points.

In any of the arrangement patterns, the BRSs are transmitted using many frequency points so that the user device 30 could perform channel estimation at many frequency points. For the radio channel with large temporal variation, it is preferable that the user device 30 perform channel estimation at many time points. Many candidate resource points are accordingly used as the BRS resource points in the arrangement pattern of FIG. 14.

For the radio channel with small temporal variation, however, it is unnecessary to perform channel estimation at many time points. Rather, many data signals should be transmitted. The data signal resource points in the figures are resource points RP dedicated to transmitting data signals. The small cell base station 20 may transmit data signals using candidate resource points. The BRS resource points in the arrangement pattern of FIG. 13 are thus thinned out in the time direction compared with those in the arrangement pattern of FIG. 14. In a case where there are many user devices 30 connected to the small cell base station 20, or when there is a large amount of downlink data, candidate resource points that are not used for transmitting the BRSs will be used for transmitting data signals.

Figure 16:
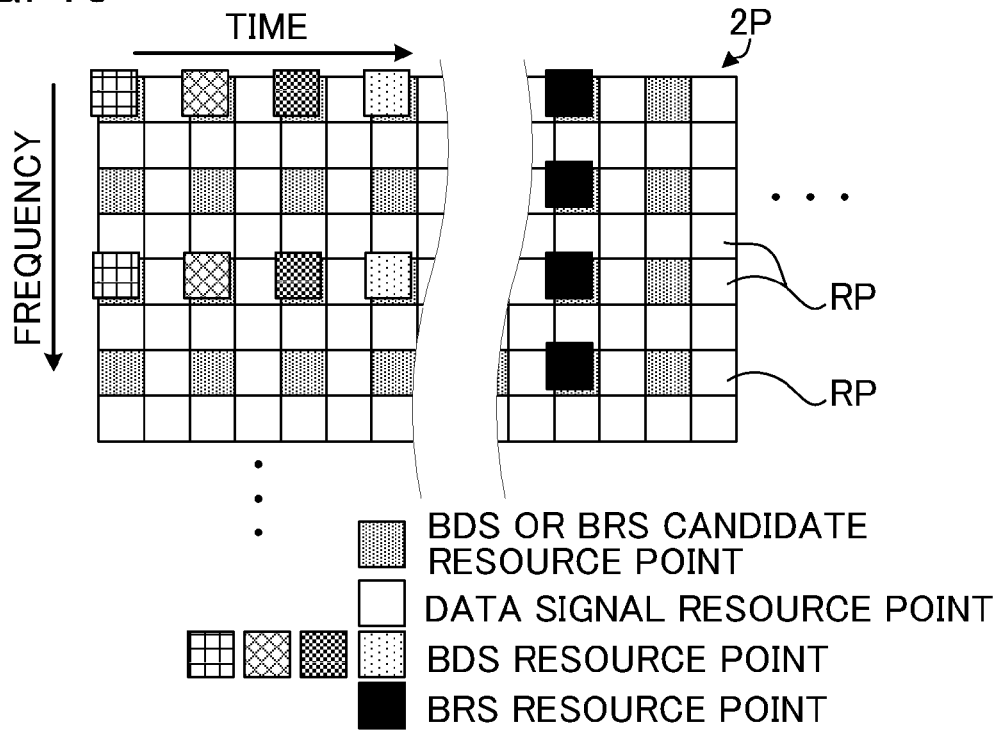
FIG. 16 is a diagram showing another example arrangement pattern of the BDSs and the BRSs.
Figure 17:
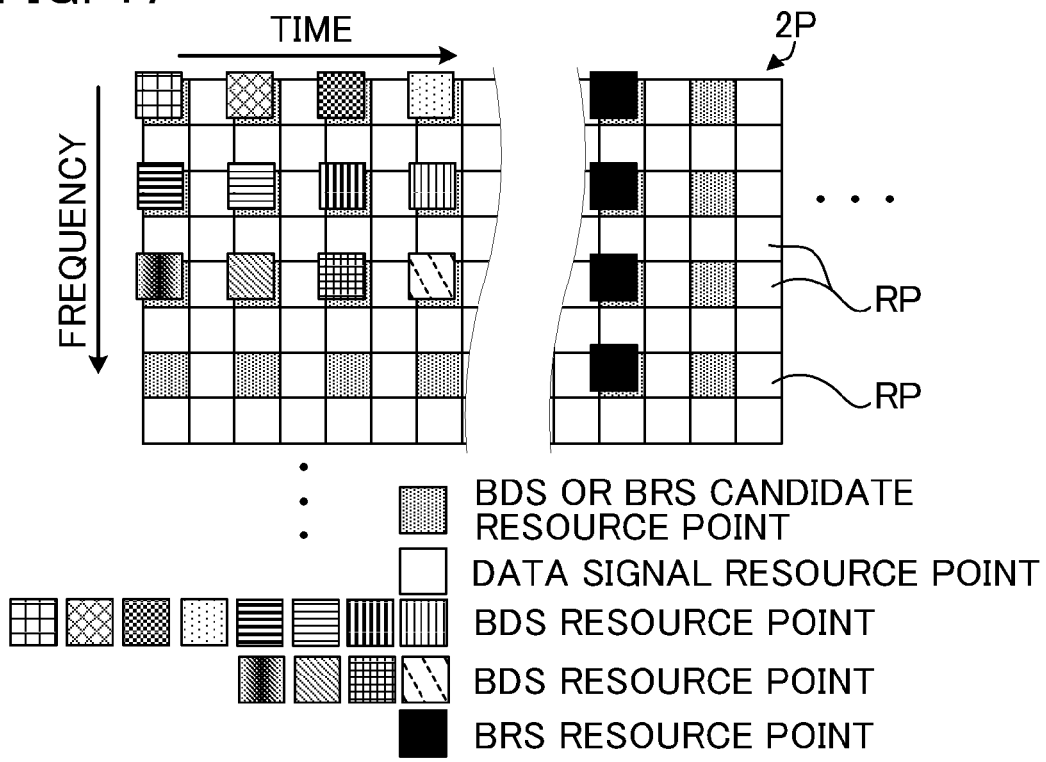
FIG. 17 is a diagram showing yet another example arrangement pattern of the BDSs and the BRSs.

For the radio channel with small temporal variation, the arrangement pattern of FIG. 16 or that of FIG. 17, instead of the arrangement pattern of FIG. 13, may be used. According to the arrangement pattern of FIG. 16, since BDSs with the same beam-direction are transmitted using multiple frequencies, the certainty of BDS reception at the user device 30 improves. At the same time, similarly to FIG. 13, BDSs with different beam-directions are transmitted by time-division transmission. According to the arrangement pattern of FIG. 17, BDSs with different beam-directions are transmitted using three frequency points and a greater number of time points. When the arrangement pattern of FIG. 17 is used, the small cell base station 20 uses a combination of the above-described time-division transmission and frequency-division transmission.

Figure 18:
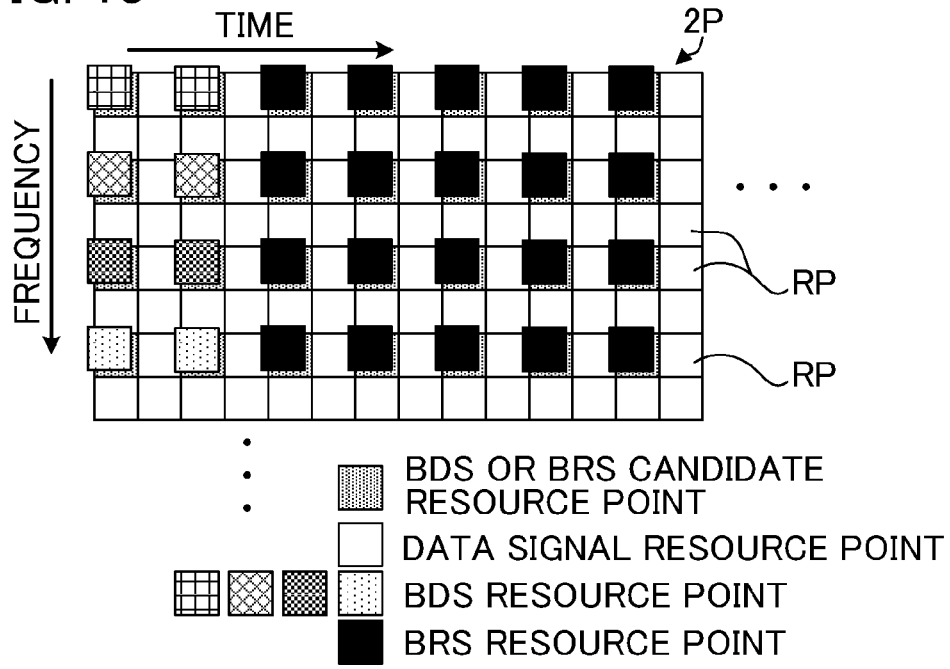
FIG. 18 is a diagram showing still another example arrangement pattern of the BDSs and the BRSs.
Figure 19:
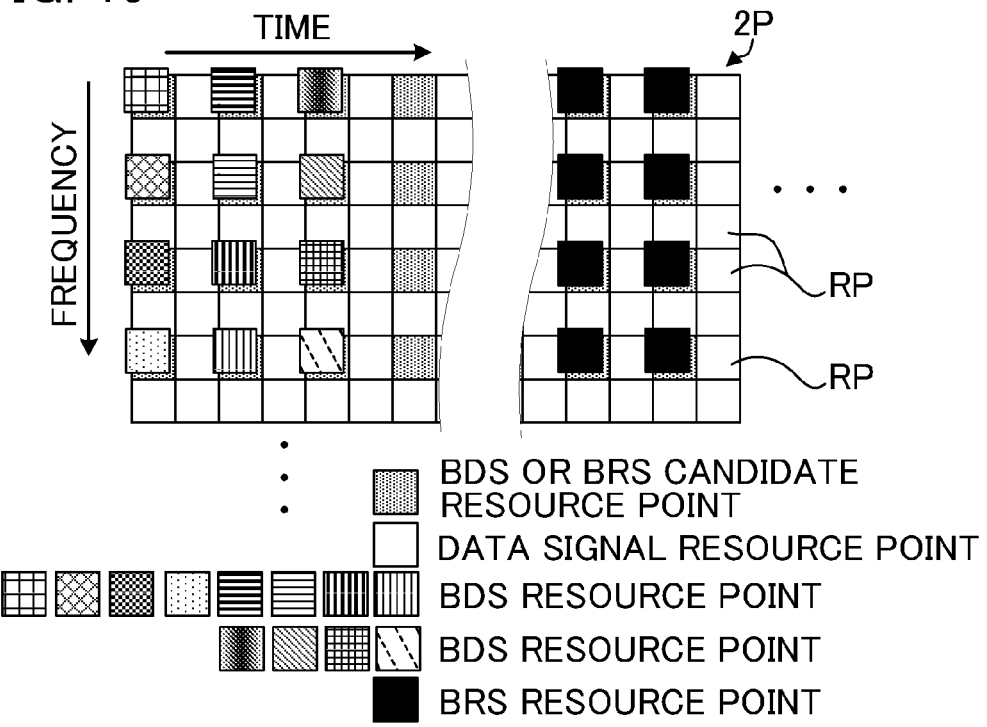
FIG. 19 is a diagram showing another example arrangement pattern of the BDSs and the BRSs.

For the radio channel with large temporal variation, the arrangement pattern of FIG. 18 or that of FIG. 19, instead of the arrangement pattern of FIG. 14, may be used. According to the arrangement pattern of FIG. 18, since BDSs with the same beam-direction are transmitted using multiple time points, the certainty of BDS reception at the user device 30 improves. At the same time, similarly to FIG. 14, BDSs with different beam-directions are transmitted by frequency-division transmission. According to the arrangement pattern of FIG. 19, BDSs with different beam-directions are transmitted using three time points and a greater number of frequency points. When the arrangement pattern of FIG. 19 is used, the small cell base station 20 uses a combination of the above-described time-division transmission and frequency-division transmission.

The pattern of the BRS resource points may be modified. For example, the pattern shown in FIG. 20 may be used for the radio channel with small temporal variation, and the pattern shown in FIG. 21 may be used for the radio channel with large temporal variation. Alternatively, the pattern shown in FIG. 22 may be used for the radio channel with small temporal variation, and the pattern shown in FIG. 23 may be used for the radio channel with large temporal variation. In a case where there are many user devices 30 connected to the small cell base station 20, or when there is a large amount of downlink data, candidate resource points that are not used for transmitting the BRSs will be used for transmitting data signals.

Figure 24:
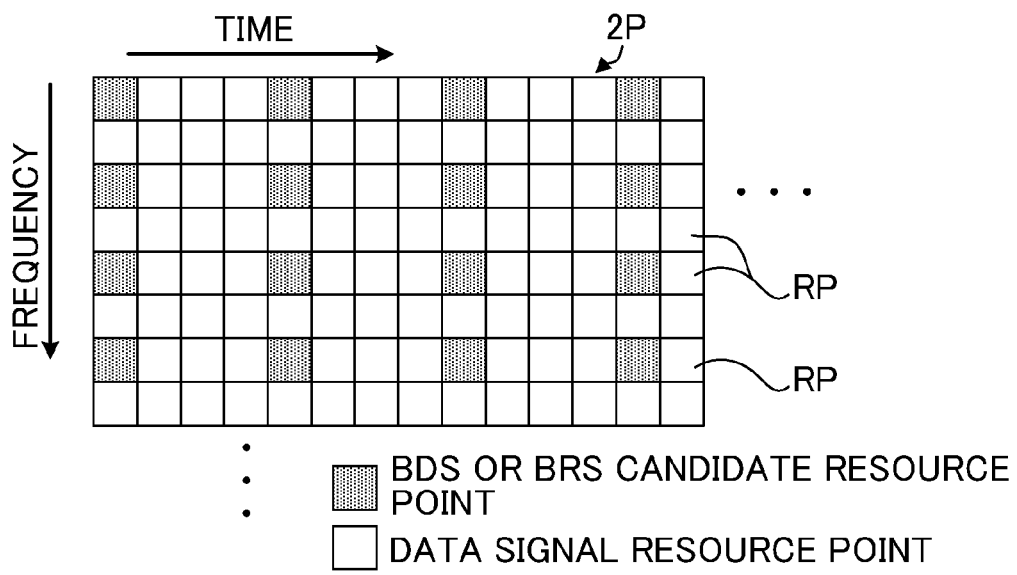
FIG. 24 is a diagram showing a modification of a pattern of candidate resource points for the BDSs or the BRSs.
Figure 25:
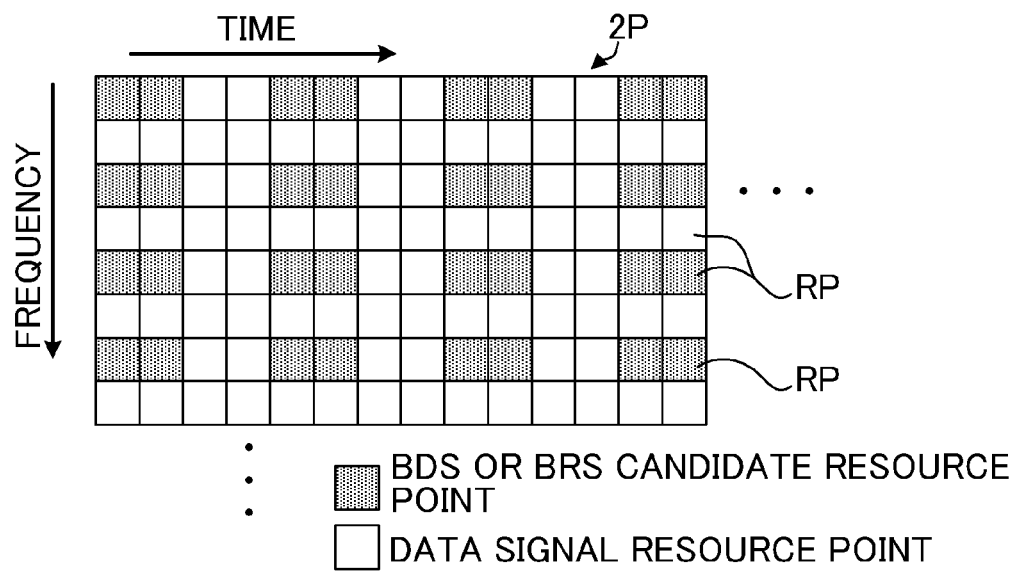
FIG. 25 is a diagram showing another modification of a pattern of candidate resource points for the BDSs or the BRSs.

The pattern of the candidate resource points may be modified. FIGS. 24 and 25 show modified patterns of the candidate resource points.

Figure 20:
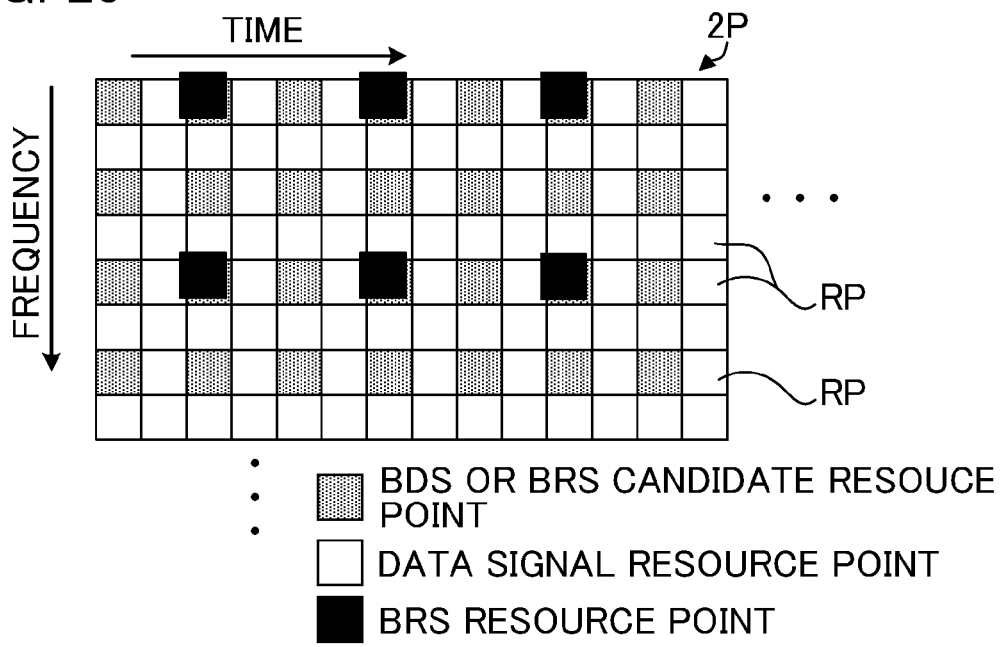
FIG. 20 is a diagram showing another example arrangement pattern of the BRSs.
Figure 21:
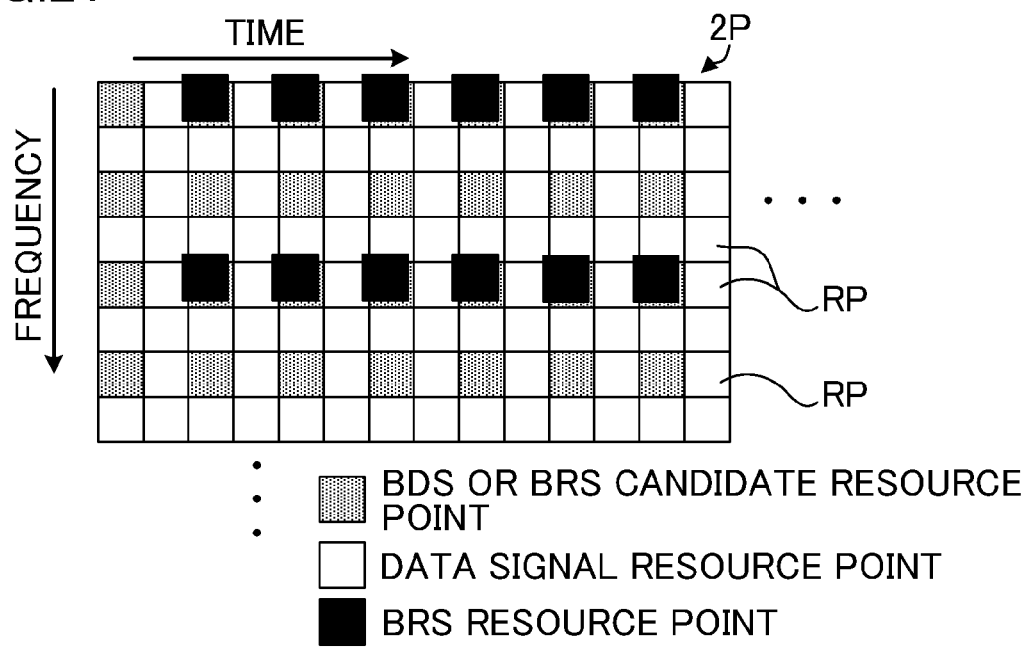
FIG. 21 is a diagram showing another example arrangement pattern of the BRSs.
Figure 22:
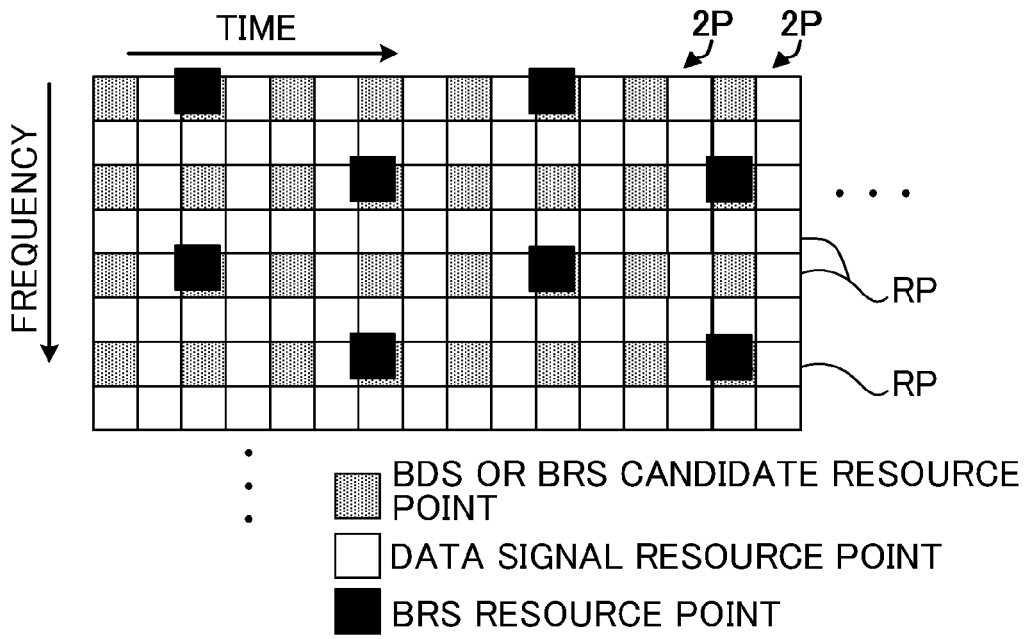
FIG. 22 is a diagram showing another example arrangement pattern of the BRSs.
Figure 23:
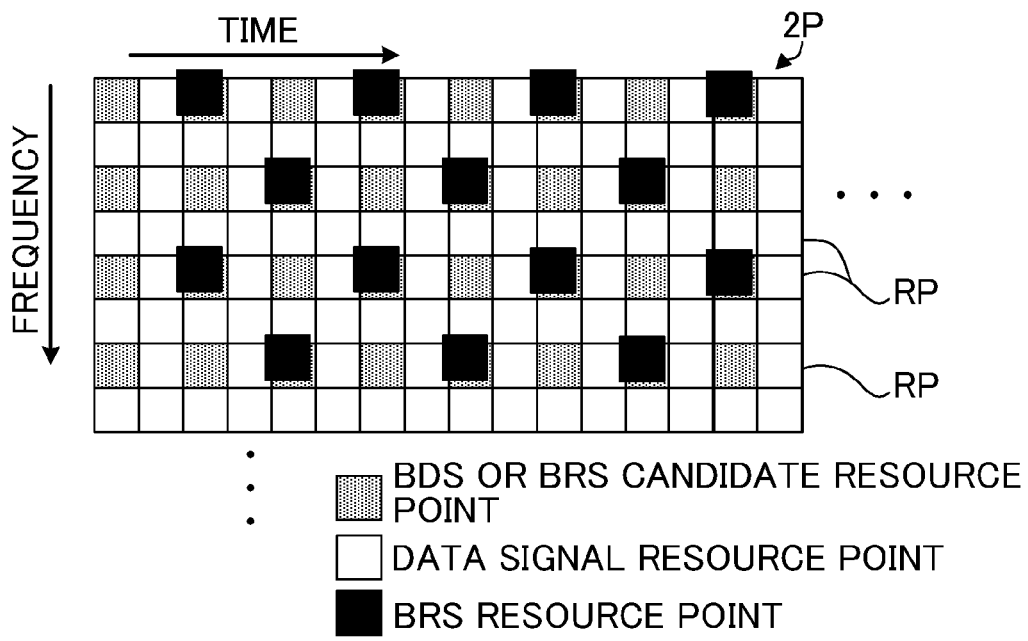
FIG. 23 is a diagram showing another example arrangement pattern of the BRSs.

In the above examples, the arrangement pattern is selected from two candidates depending on the degree of temporal variation in the radio channel. The small cell base station 20 may determine, from the indicator indicative of the surroundings, whether the frequency selectivity of the radio channel is higher than a threshold value, and based on the determination result, may select the arrangement pattern of the BDS resource points and the BRS resource points from the two candidates. For example, in a case where frequency selectivity is low, it is preferable that the BDS resource points be arranged in points at a single frequency point as shown in FIG. 13, whereas in a case where frequency selectivity is high, it is preferable that the BDS resource points with the same beam-direction be arranged in points at multiple frequency points as shown in FIG. 16. Moreover, in a case where frequency selectivity is low, it is preferable that the BRS resource points be arranged in points at a small number of frequency points as shown in FIG. 20 or FIG. 21, whereas in a case where frequency selectivity is high, it is preferable that the BDS resource points be arranged in points at multiple frequency points as shown in FIG. 14, FIG. 22, or FIG. 23.

The small cell base station 20 may determine the arrangement pattern of the BDS resource points and the BRS resource points from four candidates that are prepared beforehand, depending on whether the temporal variation in the radio channel is greater than a first threshold value and whether the frequency selectivity of the radio channel is higher than a second threshold value. Furthermore, the number of threshold values with regard to the level of temporal variation may be increased to classify the temporal variation into three or more levels. The number of threshold values with regard to the level of frequency selectivity may be increased to classify the frequency selectivity into three or more levels. A larger number of candidates appropriate to these classifications may be prepared.

Figure 26:
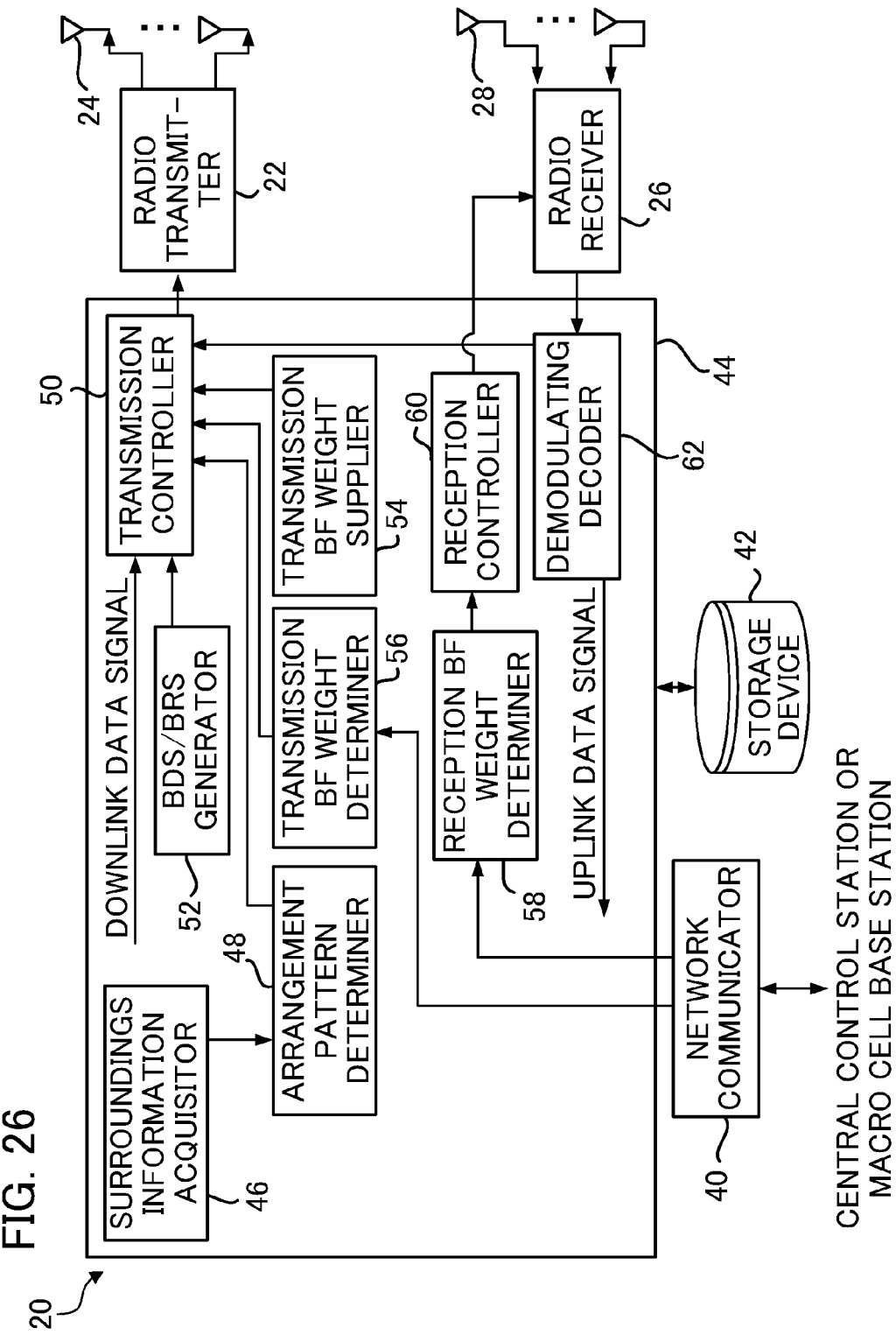
FIG. 26 is a block diagram illustrating a configuration of the small cell base station according to a first embodiment.

FIG. 26 shows a configuration of the small cell base station 20. The small cell base station 20 includes a radio transmitter 22, multiple transmitting antennas 24, a radio receiver 26, multiple receiving antennas 28, a network communicator 40, a storage device 42, and a controller 44. The radio transmitter 22 is transmission circuitry for converting electrical signals into radio waves to be transmitted from the transmitting antennas 24 to emit the radio waves. The radio receiver 26 is reception circuitry for converting radio waves received from the receiving antennas 28 into electrical signals.

The storage device 42 stores various data and a computer program for various types of communication. The stored data include data that indicate candidates beamforming weights, data that indicate candidate arrangement patterns of the BDS resource points and the BRS resource points, and data that indicate the threshold values used in determination of the arrangement pattern.

The network communicator 40 is a communication interface for the small cell base station 20 to communicate with other nodes in the network, such as the central control station 12 and the macro cell base station 10.

The controller 44 is for example a central processing unit (CPU). The controller 44 includes a surroundings information acquisitor 46, an arrangement pattern determiner 48, a transmission controller 50, a BDS/BRS generator (a beam-discovery signal generator and a beam reference signal generator) 52, a transmission beamforming (BF) weight supplier 54, a transmission beamforming weight determiner 56, a reception beamforming weight determiner 58, a reception controller 60, and a demodulating decoder 62. These elements of the controller 44 are functional blocks realized by the controller 44 executing the computer program and functioning in accordance with the computer program.

As described above, the surroundings information acquisitor 46 acquires the information related to the surroundings of the small cell base station 20, and based on that information, calculates or acquires the indicator related to the surroundings. The arrangement pattern determiner 48, based on the indicator indicative of the surroundings, classifies the radio channel according to at least one of temporal variation and frequency selectivity of the radio channel, and determines, according to the classification, the arrangement pattern of the BDS resource points and the BRS resource points. In other words, based on the surroundings of the small cell base station 20, the arrangement pattern determiner 48 determines the arrangement pattern with which multiple resource points to which the BDSs are mapped are arranged, the multiple resource points being defined by frequencies and times and being among the communication resources that are defined by frequencies and times. In determining the arrangement pattern of the BDS resource points and the BRS resource points, the arrangement pattern determiner 48 refers to the multiple candidates stored in the storage device 42 to select an appropriate arrangement pattern from these candidates. The arrangement pattern determiner 48 supplies the arrangement pattern to the transmission controller 50.

The BDS/BRS generator 52 generates the BDSs and the BRSs and supplies them to the transmission controller 50. To the transmission controller 50, the downlink data signals are also supplied. The transmission controller 50 controls downlink signal transmission performed by the radio transmitter 22.

The transmission BF weight supplier 54 retrieves from the storage device 42 data that indicate the candidate beamforming weights and supplies a set of transmission beamforming weights to the transmission controller 50. In the above-described beam-search, the transmission BF weight supplier 54 supplies a candidate set of transmission beamforming weights to the transmission controller 50. The transmission controller 50 gives the candidate set of transmission beamforming weights to the BDSs generated by the BDS/BRS generator 52 and aligns the BDSs in a manner that accords with the arrangement pattern determined by the arrangement pattern determiner 48, and then supplies the aligned BDSs to the radio transmitter 22. In this manner, in beam-search, the transmission BF weight supplier 54 and the transmission controller 50, together serving as a beam-former, give the candidate set of beamforming weights to the BDSs supplied to the transmitting antennas 24 and then adapt the BDSs to the arrangement pattern determined by the arrangement pattern determiner 48, thereby controlling the directions of radio-wave beams to be emitted from the transmitting antennas 24 and enabling the transmitting antennas 24 to emit the beams corresponding to the BDSs in multiple directions.

Based on the information that indicates the suitable direction among the directions of the beams corresponding to the BDSs, the information being fed back from the user device 30 and then received by the network communicator 40, the transmission BF weight determiner (weight determiner) 56 determines at least one set of suitable downlink beamforming weights that are to be used for communication with the user device 30. The transmission BF weight determiner 56 may determine the at least one set of suitable downlink beamforming weights to be used for communication with the user device 30, based on the location of the user device 30, the location being notified by the macro cell base station 10. The transmission BF weight determiner 56 supplies the at least one set of suitable downlink beamforming weights to the transmission controller 50.

In transmission of the BRSs, the transmission controller 50 gives the set of suitable beamforming weights to the BRSs generated by the BDS/BRS generator 52 and aligns the BRSs in a manner that accords with the arrangement pattern determined by the arrangement pattern determiner 48, and then supplies the aligned BRSs to the radio transmitter 22.

The transmission controller 50 is also provided with the CSI that is fed back from the user device 30 and is then decoded by the demodulating decoder 62. In downlink data signal transmission, the transmission controller 50 gives the set of suitable beamforming weights to the downlink data signals, controls the downlink data signals using the data transmission parameters (CQI, PMI, and RI) determined based on the CSI, and supplies the controlled downlink data signals to the radio transmitter 22.

The reception controller 60 controls uplink signal reception performed by the radio receiver 26. Electrical signals received by the radio receiver 26 are demodulated and decoded by the demodulating decoder 62. Based on the information that indicates the suitable direction among the directions of the beams corresponding to the BDSs, the information being fed back from the user device 30 and then received by the network communicator 40, the reception BF weight determiner 58 determines a set of suitable uplink beamforming weights that are to be used for communication with the user device 30. The transmission BF weight determiner 56 may determine the set of suitable uplink beamforming weights to be used for communication with the user device 30 based on the location of the user device 30, the location being notified by the macro cell base station 10. The reception BF weight determiner 58 supplies the suitable uplink beamforming weights to the reception controller 60. In this way, reception beamforming is performed on uplink signals to enable the direction of reception sensitivity of the receiving antennas 28 to be adjusted to the direction of the user device 30.

Figure 27:
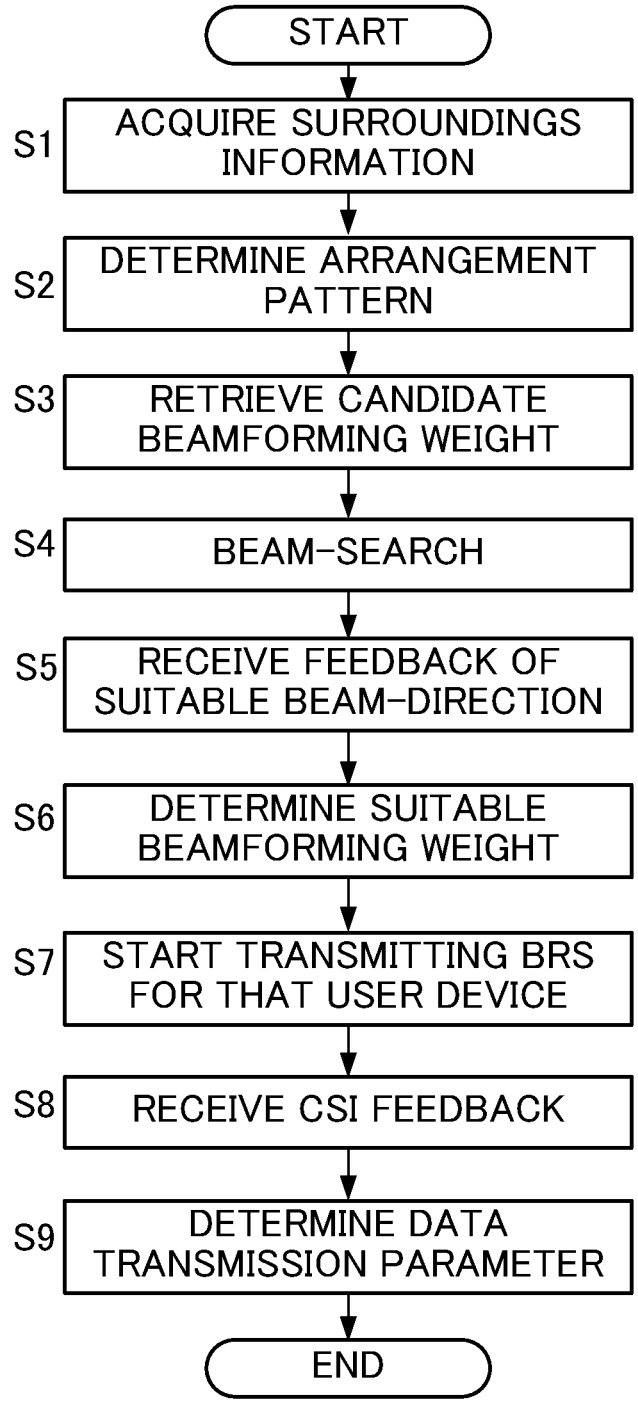
FIG. 27 is a flowchart showing how processing performed by the small cell base station proceeds.

FIG. 27 shows a flow of processing performed by the small cell base station 20. In step S1, the surroundings information acquisitor 46 acquires the information related to the surroundings of the small cell base station 20, and based on that information, calculates or acquires the indicator related to the surroundings. In step S2, the arrangement pattern determiner 48, based on the indicator indicative of the surroundings, classifies the radio channel according to at least one of temporal variation and frequency selectivity of the radio channel, and determines, according to the classification, the arrangement pattern of the BDS resource points and the BRS resource points.

In step S3, the transmission BF weight supplier 54 retrieves from the storage device 42 data that indicate the candidate set of beamforming weights. In step S4, the transmission BF weight supplier 54 and the transmission controller 50 work together to enable the beams corresponding to the BDSs to be emitted in multiple directions for beam-search.

In step S5, the network communicator 40 receives via the macro cell base station 10 feedback of the information that indicates the suitable beam-direction from the user device 30. In step S6, the transmission BF weight determiner 56 determines the set of suitable downlink beamforming weights to be given by the transmission controller 50 to the downlink data signals addressed to the user device 30 and to the BRSs.

In step S7, the transmission controller 50 starts to transmit the BRSs that, for the user device 30, have been subjected to beamforming using the set of suitable beamforming weights. In step S8, the small cell base station 20 receives feedback of the CSI from the user device 30. The network communicator 40 may receive via the macro cell base station 10 the feedback of the CSI from the user device 30, or the radio receiver 26 may receive the feedback of the CSI by the reception BF weight determiner 58 determining the set of uplink suitable beamforming weights based on the feedback of the information indicative of the suitable beam-direction from the user device 30. In step S9, the transmission controller 50 determines the data transmission parameters based on the CSI. After the above processing, the transmission controller 50 starts to transmit the data signals that, for the user device 30, have been subjected to beamforming using the set of suitable beamforming weights and have been controlled with the data transmission parameters.

As described above, in this embodiment, based on the surroundings of the small cell base station 20, the arrangement pattern is determined with which pattern the BDS resource points, to which the BDSs used for beam-search by the user device 30 are mapped, and the BRS resource points, to which the BRSs for channel estimation are mapped, are arranged. Accordingly, without a need for a very large number of resource points to transmit the BDSs and BRSs, it is possible to transmit the BDSs and the BRSs using appropriate resource points according to the radio channel state between the small cell base station 20 and the user device 30. Furthermore, since such an arrangement pattern is selected (determined) from among the pre-prepared candidates, it is possible to quickly determine the appropriate arrangement pattern according to the radio channel state.

The multiple candidates for the arrangement pattern of the BDS resource points and the BRS resource points have in common multiple to-be-examined resource points (candidate resource points) that are to be examined by the user device 30 to determine whether these resource points include the BDSs and the BRSs. In each of these multiple candidates, the BDS resource points and the BRS resource points are each arranged in a portion of the multiple to-be-examined resource points. That is, regardless of the arrangement pattern with which the BDSs and the BRSs are arranged, the BDS resource points and the BRS resource points are always included in the to-be-examined resource points. Thus, without knowing the arrangement pattern of the BDS resource points and the BRS resource points, the user device 30 is able to recognize the BDSs and the BRSs. Consequently, there is no need for the small cell base station 20 or the macro cell base station 10 to notify the user device 30 of the arrangement pattern of the BDS resource points and the BRS resource points for the small cell base station 20. As a result, it is possible to reduce the amount of traffic.

Second Embodiment

In the first embodiment, based on the surroundings of the small cell base station 20, the arrangement pattern is determined with which pattern the BDS resource points, to which the BDSs used for beam-search by the user device 30 are mapped, and the BRS resource points, to which the BRSs for channel estimation are mapped, are arranged. The arrangement pattern may be determined based on the situation of each user device 30, instead of, or in addition to, the surroundings of the small cell base station 20. This mode of the present invention will be described below as a second embodiment.

A basic configuration and functions of a small cell base station 20 according to the second embodiment are similar to those described in the first embodiment. Features that differ from those in the first embodiment are described below.

Figure 28:
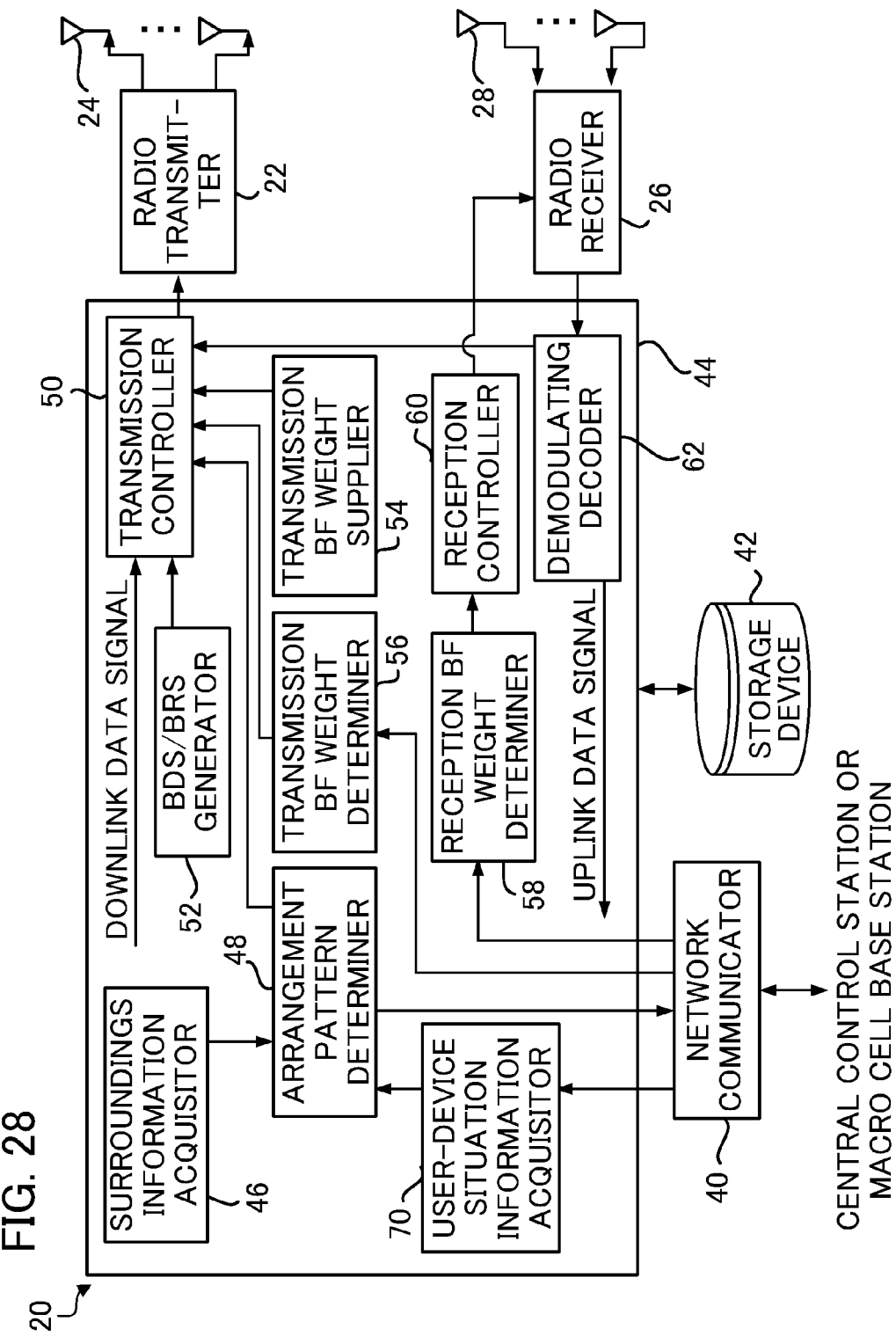
FIG. 28 is a block diagram illustrating a configuration of the small cell base station according to a second embodiment.

FIG. 28 shows a configuration of the small cell base station 20 according to the second embodiment. This small cell base station 20 includes a user-device situation information acquisitor 70 in addition to the elements described in the first embodiment. The user-device situation information acquisitor 70 is a functional block realized by the controller 44 executing the computer program and functioning in accordance with the computer program.

The user-device situation information acquisitor 70 acquires situation information of an individual user device 30, and based on the situation information, calculates an indicator that indicates the situation of that user device. The situation information of the user device 30 may be, for example, information that indicates the moving speed of the user device 30, measured by the user device 30 itself, or may be information that indicates a moving image that is taken by a camera of the user device 30. Alternatively or additionally, the situation information of the user device 30 may be information that indicates the location of the user device 30 and the distance from the small cell base station 20 to the user device 30. The location of the user device 30 may be obtained by the user device 30 measuring the position using GPS or any other positioning system. The distance from the small cell base station 20 to the user device 30 may be calculated by the small cell base station 20 or another node in the network, based on the position of the user device 30 calculated by the user device 30. Alternatively or additionally, the situation information of the user device 30 may be information that indicates a moving distance of the user device 30. The moving distance may be calculated by the small cell base station 20 or another node in the network, based on the location of the user device 30 calculated by the user device 30.

In the process in which the user device 30 that is not connected to the small cell base station 20 initially establishes a connection, the situation information of the user device 30 is supplied to the user-device situation information acquisitor 70 in the network-assisted manner. In other words, the user device 30 transmits the situation information to the macro cell base station 10, the macro cell base station 10 then forwards that information to the small cell base station 20, and the small cell base station 20 receives that information with the network communicator 40. In the process in which the user device 30 has already been connected to the small cell base station 20, the small cell base station 20 may acquire the situation information in the network-assisted manner or may directly receive the situation information from the user device 30.

The arrangement pattern determiner 48, for each user device 30, based on the indicator that is supplied from the user-device situation information acquisitor 70 and is indicative of the situation of that user device, as well as based on the indicator that is supplied from the surroundings information acquisitor 46 and is indicative of the surroundings, classifies the radio channel according to at least one of temporal variation and frequency selectivity of the radio channel, and determines, according to the classification, the arrangement pattern of the BDS resource points and the BRS resource points for the user device 30.

Similarly to the first embodiment, the arrangement pattern determiner 48 may determine the arrangement pattern according to the degree of temporal variation in the radio channel. For example, the arrangement pattern shown in FIG. 13, FIG. 16, or FIG. 17 may be selected for the radio channel with small temporal variation, and the arrangement pattern shown in FIG. 14, FIG. 18, or FIG. 19 may be selected for the radio channel with large temporal variation. The arrangement pattern determiner 48 may determine the arrangement pattern according to the frequency selectivity of the radio channel. For example, in a case where frequency selectivity is low, it is preferable that the BDS resource points be arranged in points at a single frequency point as shown in FIG. 13, whereas in a case where frequency selectivity is high, it is preferable that the BDS resource points with the same beam-direction be arranged in points at multiple frequency points as shown in FIG. 16. Moreover, in a case where frequency selectivity is low, it is preferable that the BRS resource points be arranged in points at a small number of frequency points as shown in FIG. 20 or FIG. 21, whereas in a case where frequency selectivity is high, it is preferable that the BDS resource points be arranged in points at multiple frequency points as shown in FIG. 14, FIG. 22, or FIG. 23. As described above, similarly to the first embodiment, the selection of the arrangement pattern may be performed in various manners.

In this embodiment, the arrangement pattern determiner 48 determines the arrangement pattern for each user device 30 based on the situation of that user device 30. Since the arrangement pattern may vary between user devices 30 in this embodiment, the arrangement pattern determiner 48 notifies each user device 30 of information indicative of the arrangement pattern for that user device 30. In the process in which the user device 30 that is not connected to the small cell base station 20 initially establishes a connection, the arrangement pattern determiner 48 may supply the information indicative of the arrangement pattern to the network communicator 40 by including the information in side-information, and may then deliver the information indicative of the arrangement pattern in the network-assisted manner to the user device 30 to which the information is addressed. In other words, the macro cell base station 10 forwards it to the user device 30. In the process in which the user device 30 has already been connected to the small cell base station 20, the information indicative of the arrangement pattern may be delivered to the addressed user device 30 in the network-assisted manner, or may be delivered to the addressed user device 30 by being included in a downlink control signal.

Figure 29:
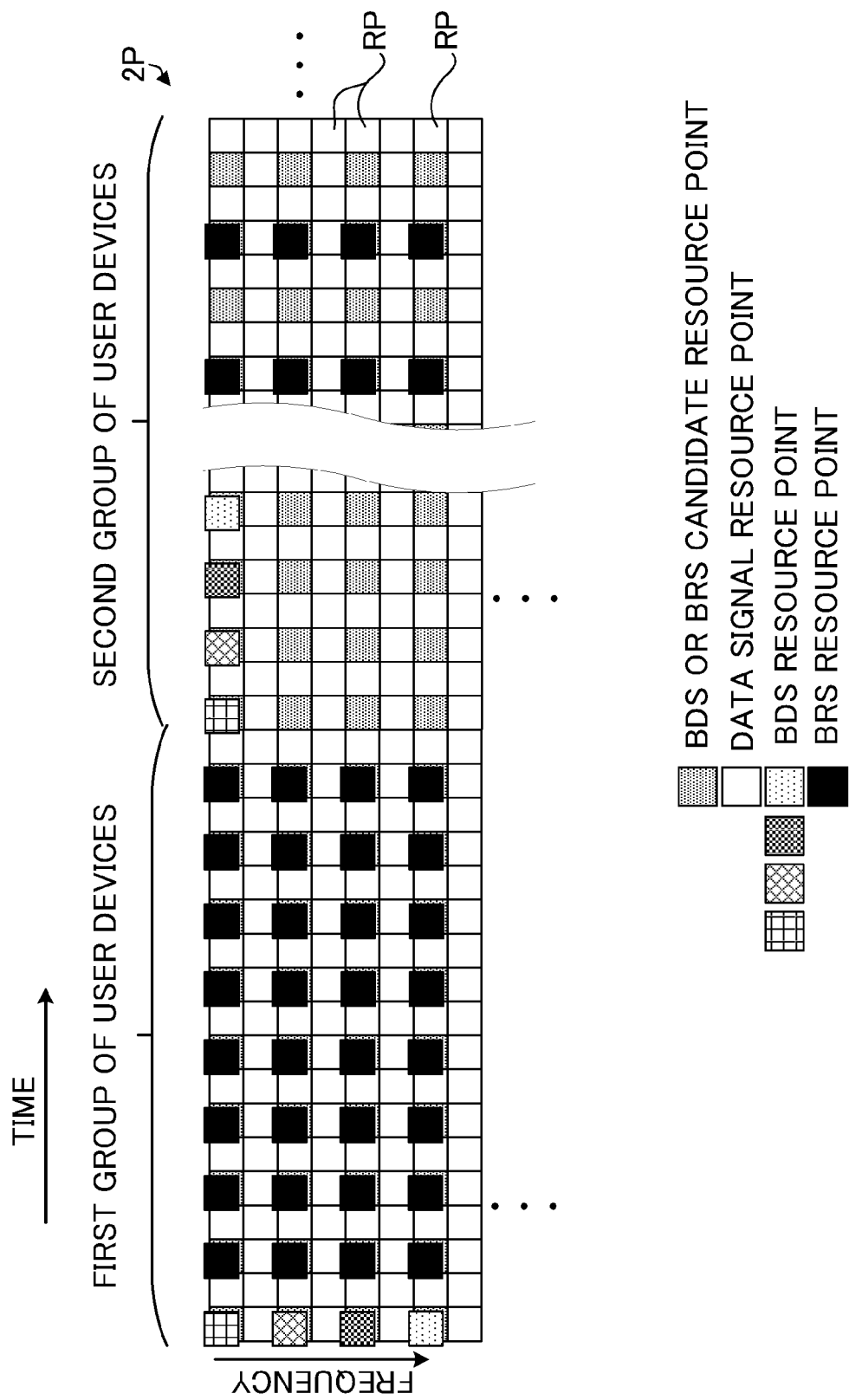
FIG. 29 shows an example in which different arrangement patterns are used in the second period according to the second embodiment.

In the second period 2P shown in FIG. 10, the BDS resource points and the BRS resource points are arranged in arrangement patterns different from one another. FIG. 29 shows an example in which different arrangement patterns are used in the second period 2P. For example, the initial portion in FIG. 29 is allocated to the first group of user devices, and the next portion is allocated to the second group of user devices. The first group of user devices is composed of user devices 30 that correspond to radio channels with large temporal variation. To the first group of user devices, a transmission pattern similar to that shown in FIG. 14 is assigned, for example. The second group of user devices is composed of user devices 30 that correspond to radio channels with small temporal variation. To the second group of user devices, a transmission pattern similar to that shown in FIG. 13 is assigned, for example. The period during which the BDSs and the BRSs are transmitted using these arrangement patterns will also be notified to user devices 30 that correspond to these arrangement patterns by the arrangement pattern determiner 48. More specifically, the first group of user devices are notified of the period in which the arrangement pattern for the first group of user devices is used, and the second group of user devices are notified of the period in which the arrangement pattern for the second group of user devices is used. In other words, each user device 30 is notified of the BDS resource points and the BRS resource points that the user device 30 should examine. Thus, there is no need for each user device 30 to examine BDS resource points and BRS resource points for other user devices.

In the process of initial connection establishment, the arrangement pattern determiner 48 may supply information indicative of the period in which the corresponding arrangement pattern is used to the network communicator 40 by including the information in the side-information, and may then deliver the information indicative of the use period of the arrangement pattern in the network-assisted manner to the user device 30 to which the information is addressed. In other words, the macro cell base station 10 forwards it to the user device 30. In the process in which the user device 30 has already been connected to the small cell base station 20, the information indicative of the use period of the arrangement pattern may be delivered to the addressed user device 30 in the network-assisted manner, or may be delivered to the addressed user device 30 by being included in a downlink control signal.

As described above, in this embodiment, based on the situation of each user device 30, the arrangement pattern is determined, with which pattern the BDS resource points, to which the BDSs used for beam-search by the user device 30 are mapped, and the BRS resource points, to which the BRSs for channel estimation are mapped, are arranged. Accordingly, without a need for a very large number of resource points to transmit the BDSs and BRSs, it is possible to transmit the BDSs and the BRSs using appropriate resource points according to the radio channel state between the small cell base station 20 and the user device 30. Furthermore, since such an arrangement pattern is selected (determined) from among the pre-prepared candidates, it is possible to quickly determine the appropriate arrangement pattern according to the radio channel state.

Additionally, in this embodiment, according to the situation of each user device 30, the BDS resource points and the BRS resource points that the user device 30 is to examine can be customized.

Figure 30:
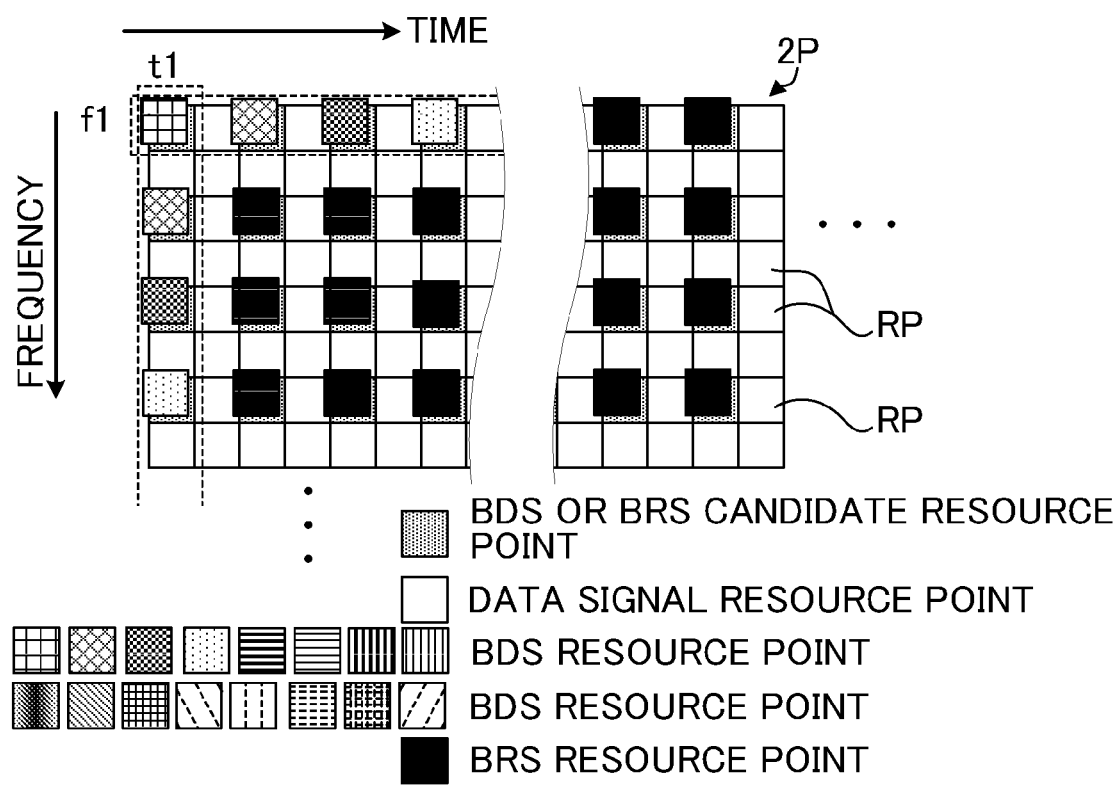
FIG. 30 is a diagram showing a single arrangement pattern of BDSs and BRSs that can be used by the small cell base station.

The small cell base station 20 may use a single arrangement pattern. For example, FIG. 30 shows an arrangement pattern in which BDS resource points that correspond to all the beam-directions in which the small cell base station 20 can emit beams are arranged at a frequency point f1 over multiple time points, and in which arrangement pattern BDS resource points that correspond to all the beam-directions in which the small cell base station 20 can emit beams are arranged at a time point t1 over multiple frequency points. In this arrangement pattern, the BRS resource points are arranged at many frequency points and at many time points.

The small cell base station 20 may transmit the BDSs and the BRSs in accordance with this arrangement pattern and may notify each user device 30 of the arrangement pattern of BDS resource points and BRS resource points for that user device. For example, the arrangement pattern determiner 48 of the small cell base station 20 allocates, to the first group of user devices having radio channels with small temporal variation, BDS resource points that belong to the frequency point f1 and use multiple time points, whereas to the second group of user devices having radio channels with large temporal variation, the arrangement pattern determiner 48 allocates BDS resource points that belong to the time point t1 and use multiple frequency points. Then, the arrangement pattern determiner 48 notifies each user device of the BDS resource points that the user device is to use. The arrangement pattern determiner 48 allocates, to the first group of user devices having radio channels with small temporal variation, BRS resource points that belong to a small number of time points (e.g., allocates BRS resource points at four-time-point intervals). The arrangement pattern determiner 48 allocates, to the second group of user devices having radio channels with large temporal variation, BRS resource points that belong to a large number of time points (e.g., allocates BRS resource points at two-time-point intervals). The arrangement pattern determiner 48 then notifies the user devices of their respective allocated BRS resource points.

Figure 31:
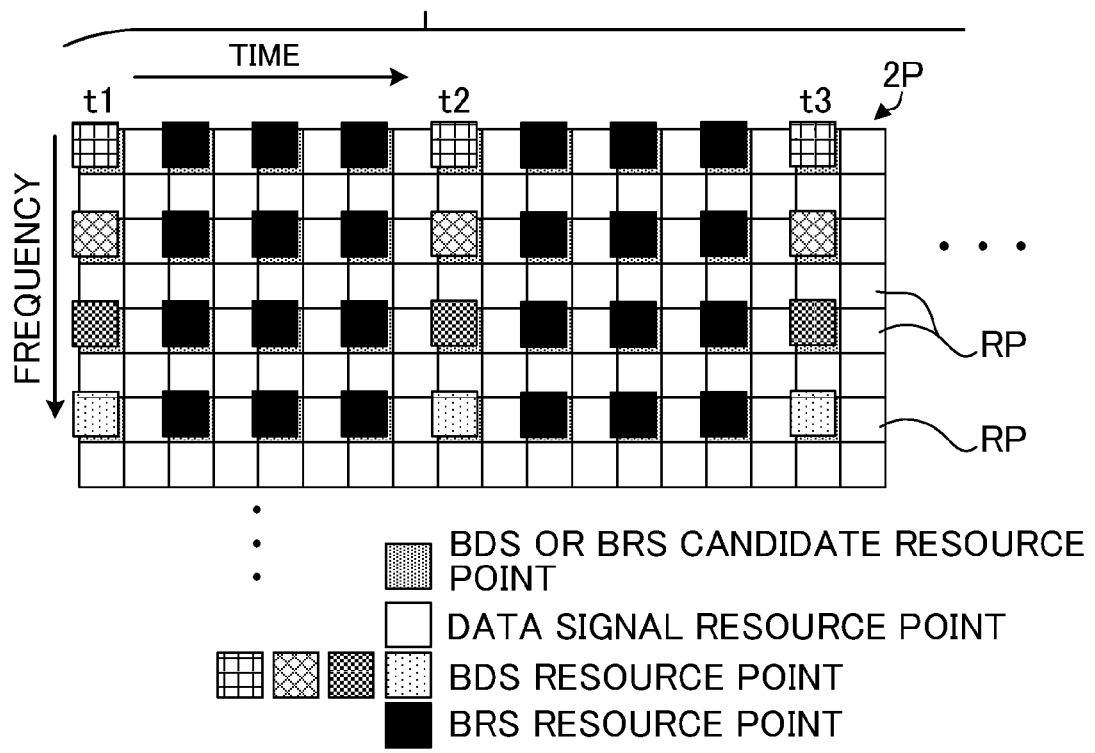
FIG. 31 is a diagram showing another example arrangement pattern of the BDSs and the BRSs that can be used by the small cell base station.

With regard to the user devices 30 having radio channels with large temporal variation, the above-described stepwise beam-search may be performed using the arrangement pattern shown in FIG. 31. In the arrangement pattern shown in FIG. 31, the BDS resource points that correspond to all the beam-directions in which the small cell base station 20 can emit beams are arranged over many frequency points periodically at time points t1, t2, t3, etc. At the time point t1, the user device 30 examines the received powers of nine BDSs corresponding to the first nine zones Z shown in FIG. 9. If the received powers of these BDSs are all extremely low, the user device 30 examines at the next time point t2 the received powers of nine BDSs corresponding to the next nine zones Z. If any of the BDSs is received with a high received power at the time point t1, the user device 30 examines at the next time point t2 the received powers of three BDSs corresponding to three zones Z that belong to the first nine zones Z. By the small cell base station 20 first indicating to the user device 30 frequency points and time points at which the BDSs are mapped (i.e., the arrangement pattern of the BDS resource points), the user device 30 will thereafter be able to, according to the results of BDS received powers, determine on its own the BDS resource points that should be examined next. The stepwise cell-search may be performed in various manners.

In the process in which the user device 30 has already been connected to the small cell base station 20, the arrangement pattern determiner 48 of the small cell base station 20 may determine the range of beam-directions that would be suited to the user device 30 based on the moving distance of the user device 30 and on the beamforming weights that are in use for the user device 30. Then, the arrangement pattern with which there are arranged only those BDSs that are subjected to beamforming with beamforming weights corresponding to that range may be determined for that user device 30 and then notified to the user device 30. By examining the received powers of the BDSs arranged in that limited arrangement pattern, the user device 30 will be able to quickly determine the suitable beam-direction.

Third Embodiment

In the first and second embodiments, the small cell base station 20 (radio transmission station) determines the arrangement pattern of both downlink BDSs and downlink BRSs. Alternatively, the small cell base station 20 (radio transmission station) may determine the arrangement pattern of downlink BDSs and the arrangement pattern of uplink BRSs.

In the operations described above with reference to FIG. 5, a downlink BRS is used for estimating a channel state between the small cell base station 20 and the user device 30 (radio reception station), and based on the reception result of the BRS, the user device 30 estimates a channel state that corresponds to the suitable direction. According to the CSI fed back from the user device 30, the small cell base station 20 determines the downlink data transmission parameters suited to the user device 30.

If the user device 30 has multiple antennas, and if the user device 30 can perform beamforming that corresponds to the direction that is the reverse of the suitable direction to transmit an uplink reference signal that has been subjected to beamforming, the small cell base station 20 will be able to estimate a channel state that corresponds to the suitable direction based on the reception result of that reference signal (uplink BRS), and according to CSI obtained as a result of the estimation, will be able to determine downlink data transmission parameters suited to the user device 30. In a time division duplexed (TDD) network system in which downlink transmission and uplink transmission are alternately performed using the same frequency band, the downlink channel state and the uplink channel state are basically the same. If the uplink channel state is used in place of the downlink channel state, the downlink BRS is unnecessary and the uplink BRS (reverse-direction BRS) is used instead. This mode of the present invention will be described below as a third embodiment.

Figure 32:
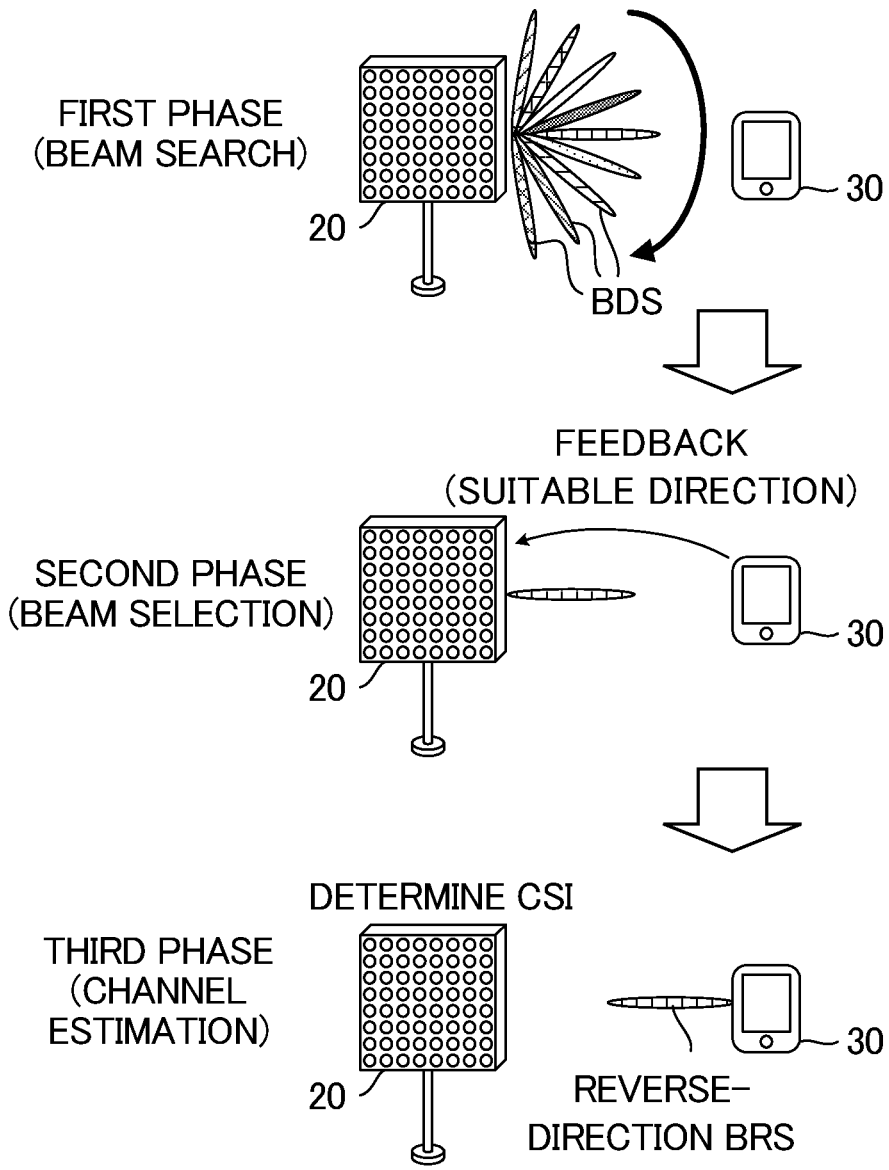
FIG. 32 is a diagram schematically illustrating operational phases for a user device according to a third embodiment to communicate with the small cell base station.

FIG. 5 is modified as shown in FIG. 32. The first and second phases are the same as those in FIG. 5. In the third phase, the user device 30 transmits, with a beam with a direction that is the reverse of the suitable direction, an uplink reference signal that has a direction controlled with suitable beamforming weights for the user device 30. Since beamforming is performed on this uplink reference signal, this uplink reference signal may be referred to as a "reverse-direction beamformed reference signal" or a "reverse-direction beam reference signal" (BRS). The small cell base station 20 may notify the user device 30 of the suitable beamforming weights determined in the second phase in the network-assisted manner, for example. Alternatively, in a case where the user device 30 notifies the small cell base station 20 of the most suitable beam-direction alone, since the suitable beamforming weights determined by the user device 30 in the second phase correspond to the most suitable direction determined by the user device 30, there is no need for the small cell base station 20 to notify the user device 30 of the suitable beamforming weights. In this case, the user device 30 may determine the suitable beamforming weights based on the most suitable beam-direction.

Figure 33:
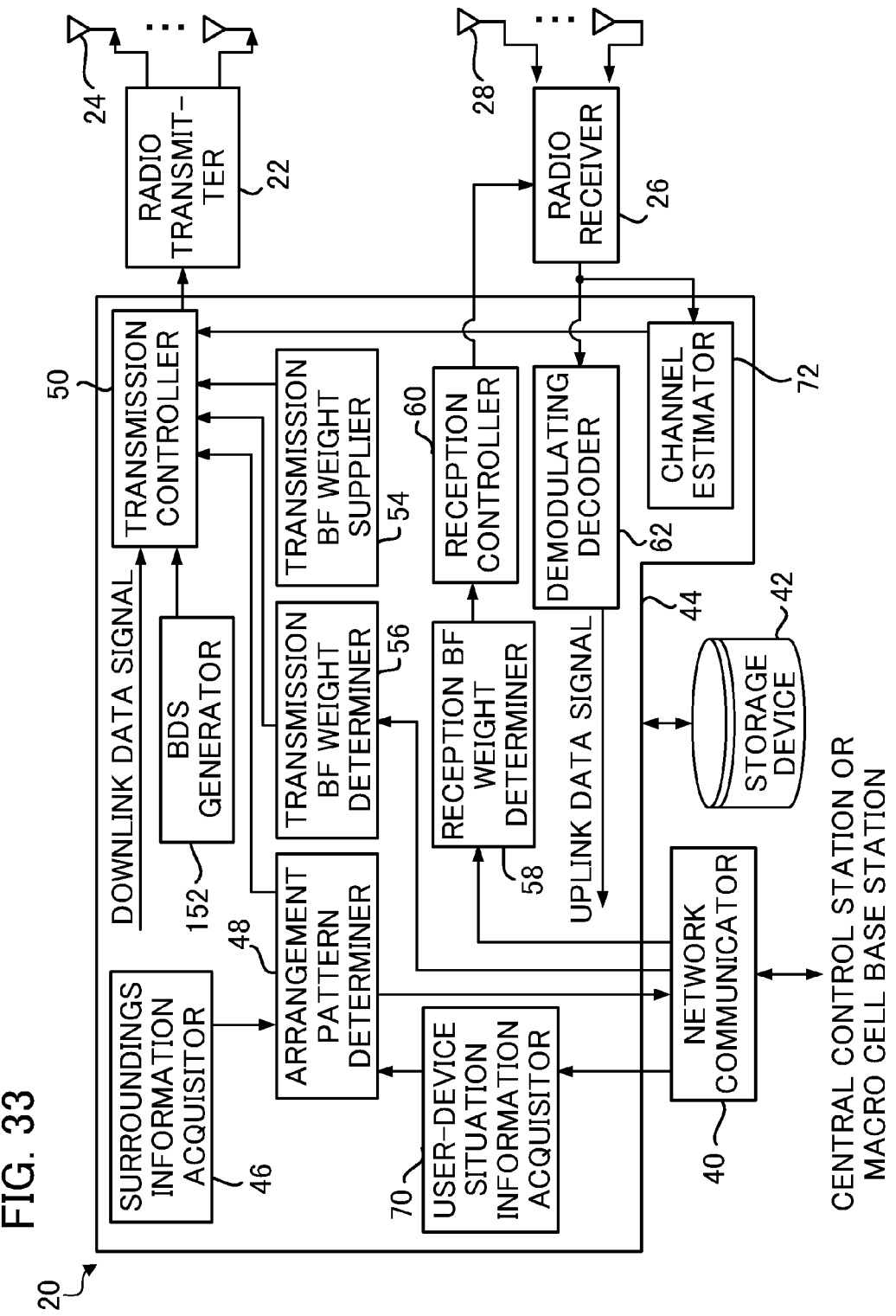
FIG. 33 is a block diagram illustrating a configuration of the small cell base station according to the third embodiment.

A small cell base station 20 according to this embodiment may be obtained by modifying that in the first embodiment shown in FIG. 26 or that in the second embodiment shown in FIG. 28. FIG. 33 shows an example configuration of the small cell base station 20 according to this embodiment. This example is a modification of that in the second embodiment. Features that differ from those in the second embodiment are described below.

The controller 44 of the small cell base station 20 includes a channel estimator 72 in addition to the elements described in the second embodiment. The controller 44 includes a BDS generator 152 instead of the BDS/BRS generator 52. The channel estimator 72 and the BDS generator 152 are each a functional block realized by the controller 44 executing the computer program and functioning in accordance with the computer program.

In this embodiment, for each user device 30, based on the indicator that is supplied from the user-device situation information acquisitor 70 and is indicative of the situation of that user device, as well as based on the indicator that is supplied from the surroundings information acquisitor 46 and is indicative of the surroundings, the arrangement pattern determiner 48 classifies the radio channel according to at least one of temporal variation and frequency selectivity of the radio channel, and determines, according to the classification, the arrangement pattern of the downlink BDS resource points for the user device 30. The arrangement pattern determiner 48 also serves as a reverse-direction arrangement pattern determiner, and determines, based on the classification of the radio channel, the arrangement pattern of uplink reverse-direction BRS resource points for each user device 30. The arrangement pattern of the uplink BRS resource points is an arrangement pattern of multiple resource points to which there is mapped a reverse-direction BRS that should be transmitted by the user device 30 with a beam that is directed in a direction that is the reverse of the suitable direction. In a case where the first embodiment is to be modified, the arrangement pattern determiner 48 classifies the radio channel based on the indicator that is supplied from the surroundings information acquisitor 46 and is indicative of the surroundings, and according to that classification, determines the arrangement pattern of the downlink BDS resource points and the arrangement pattern of the uplink reverse-direction BRS resource points.

Figure 34:
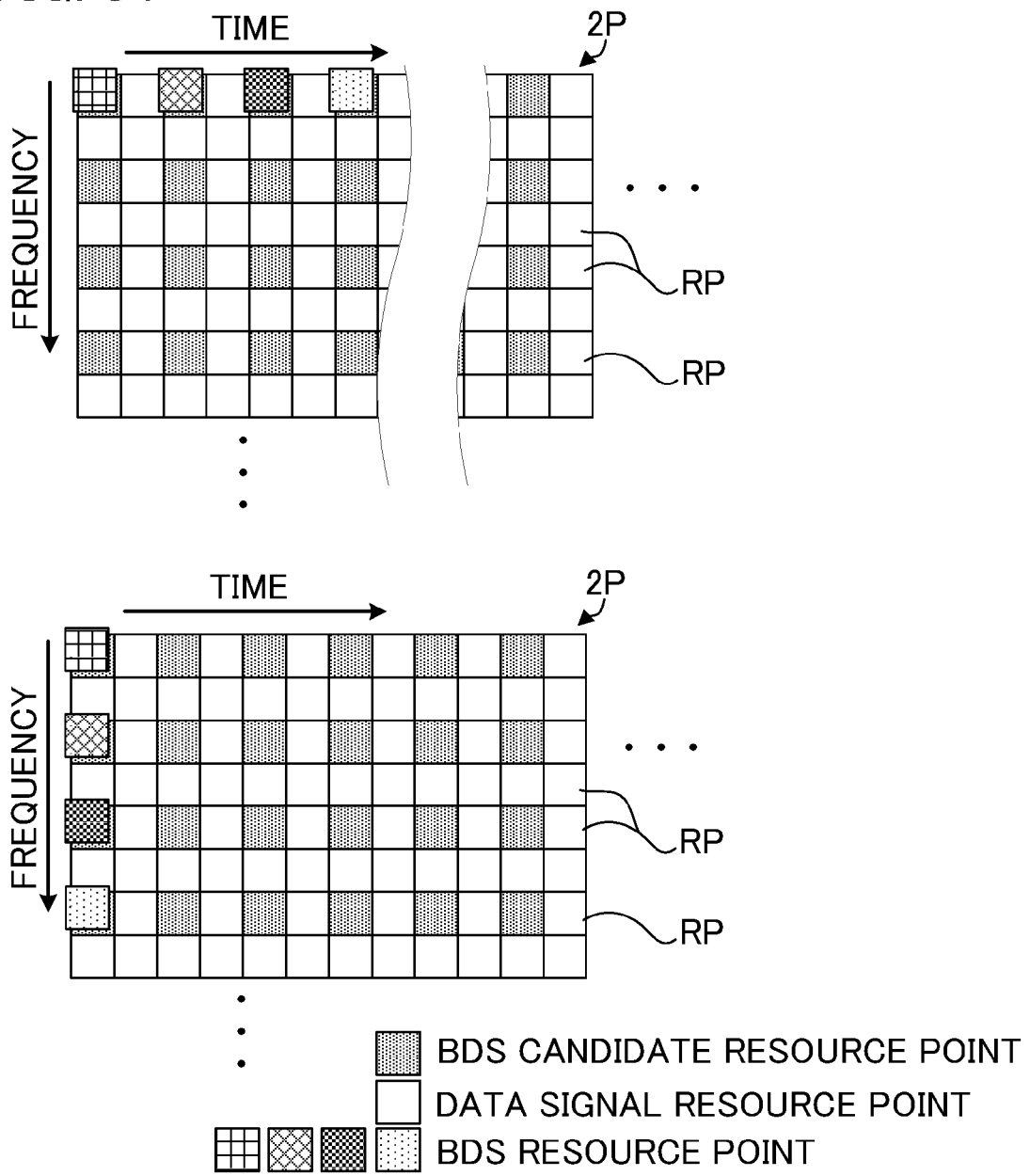
FIG. 34 is a diagram illustrating candidate arrangement patterns of BDSs according to the third embodiment.
Figure 35:
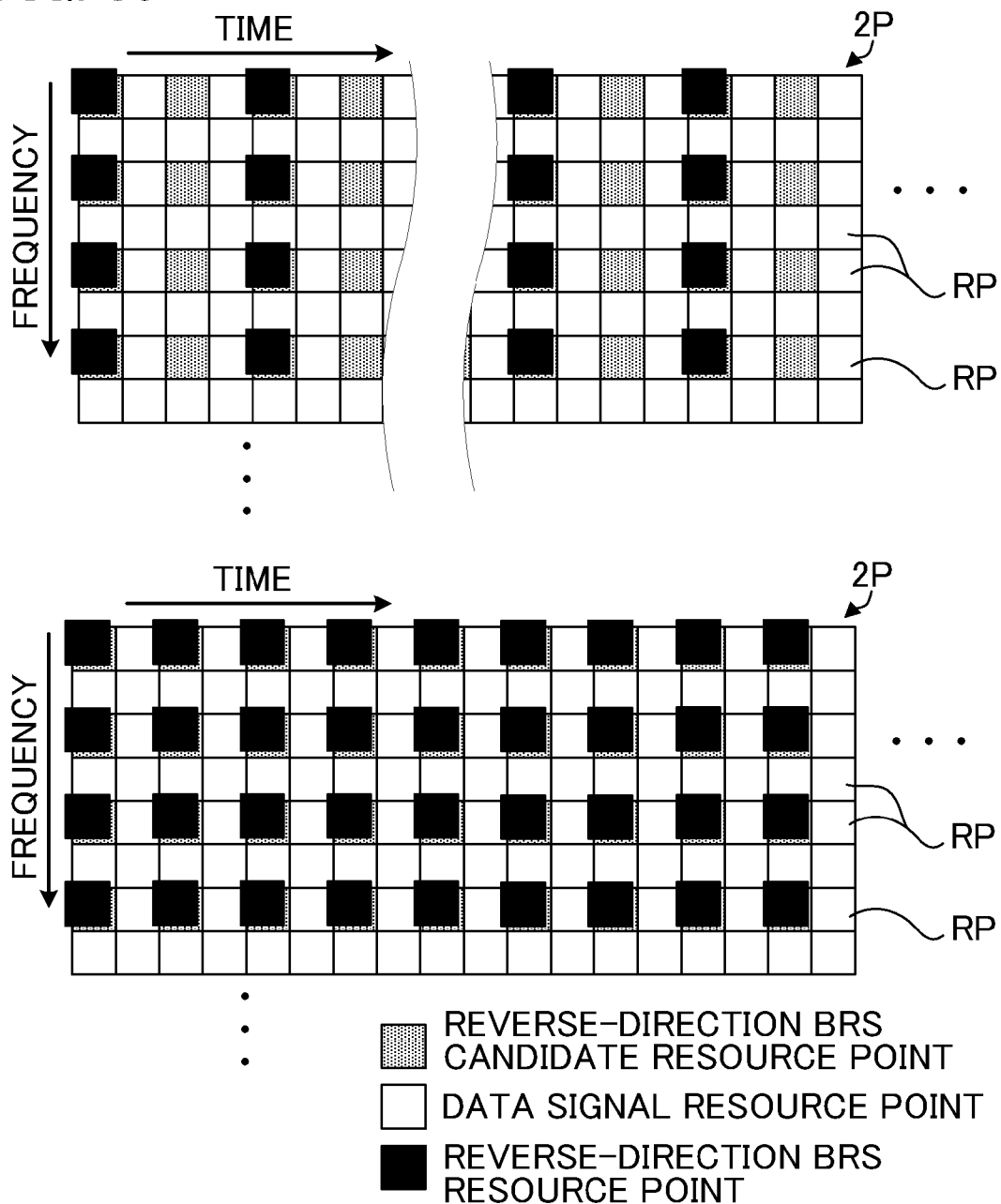
FIG. 35 is a diagram illustrating candidate arrangement patterns of reverse-direction BRSs according to the third embodiment.

FIG. 34 shows an example candidate arrangement pattern of the downlink BDS resource points, and FIG. 35 shows an example candidate arrangement pattern of the uplink reverse-direction BRS resource points, the candidate arrangement patterns each being selected in the arrangement pattern determiner 48. As is clear from the description given with reference to FIGS. 13 and 14, the example candidate arrangement pattern of the BDS resource points shown in the upper part of FIG. 34 is suited to a radio channel with small temporal variation, whereas the example candidate arrangement pattern of the BDS resource points shown in the lower part of FIG. 34 is suited to a radio channel with large temporal variation. The example candidate arrangement pattern of the reverse-direction BRS resource points shown in the upper part of FIG. 35 is suited to a radio channel with small temporal variation, whereas the example candidate arrangement pattern of the reverse-direction BRS resource points shown in the lower part of FIG. 35 is suited to a radio channel with large temporal variation.

In performance of beam-search, the BDS generator 152 generates BDSs and supplies the BDSs to the transmission controller 50. The transmission BF weight supplier 54 and the transmission controller 50, together serving as a beamformer, give the candidate set of beamforming weights to the BDSs supplied to the transmitting antennas 24 and then adapt the downlink BDSs to the arrangement pattern determined by the arrangement pattern determiner 48, thereby controlling the directions of radio-wave beams to be emitted from the transmitting antennas 24 and enabling the transmitting antennas 24 to emit the beams corresponding to the downlink BDSs in multiple directions.

The arrangement pattern determiner 48 also serves as an arrangement pattern indicator, and indicates to each user device 30 the arrangement pattern of the reverse-direction BRS resource points for that user device 30. In the process in which the user device 30 that is not connected to the small cell base station 20 initially establishes a connection, the arrangement pattern determiner 48 may supply information indicative of the arrangement pattern to the network communicator 40 by including the information in side-information, and may then deliver the information indicative of the arrangement pattern in the network-assisted manner to the user device 30 to which the information is addressed. In other words, the macro cell base station 10 forwards it to the user device 30. In the process in which the user device 30 has already been connected to the small cell base station 20, the information indicative of the arrangement pattern may be delivered to the addressed user device 30 in the network-assisted manner, or may be delivered to the addressed user device 30 by being included in a downlink control signal.

Having been notified of the arrangement pattern of the reverse-direction BRS resource points, the user device 30 transmits uplink reverse-direction BRSs that are arranged according to the notified arrangement pattern. The radio receiver 26 of the small cell base station 20 receives an uplink signal that includes the reverse-direction BRSs. Based on the reception result of the reverse-direction BRSs, the channel estimator 72 estimates and determines a channel state corresponding to the suitable direction, and supplies the determined CSI to the transmission controller 50. In downlink data signal transmission, the transmission controller 50 gives the set of suitable beamforming weights to the downlink data signals, controls the downlink data signals using the data transmission parameters (CQI, PMI, and RI) determined based on the CSI, and supplies the controlled downlink data signals to the radio transmitter 22.

As shown in FIG. 34, the multiple candidates for the arrangement pattern of the downlink BDS resource points have in common multiple to-be-examined resource points (candidate resource points) that are to be examined by the user device 30 to determine whether these resource points include the BDSs. In each of these multiple candidates, the BDS resource points are arranged in a portion of the multiple to-be-examined resource points. That is, regardless of the arrangement pattern with which the BDSs are arranged, the BDS resource points are always included in the to-be-examined resource points. Thus, in a case where the first embodiment is modified, the user device 30 is able to recognize the BDSs without knowing the arrangement pattern of the BDS resource points. Consequently, there is no need for the small cell base station 20 or the macro cell base station 10 to notify the user device 30 of the arrangement pattern of the BDS resource points for the small cell base station 20. As a result, it is possible to reduce the amount of traffic. In a case where the second embodiment is modified, however, the arrangement pattern of the BDS resource points may vary between user devices 30, and therefore, each user device 30 must know the arrangement pattern of the BDS resource points.

As shown in FIG. 35, the multiple candidates for the arrangement pattern of the uplink reverse-direction BRS resource points have in common multiple to-be-examined resource points (candidate resource points) that are to be examined by the small cell base station 20 to determine whether these resource points include the reverse-direction BRSs. In each of these multiple candidates, the reverse-direction BRS resource points are arranged in a portion of the multiple to-be-examined resource points. That is, regardless of the arrangement pattern with which the reverse-direction BRSs are arranged, the reverse-direction BRS resource points are always included in the to-be-examined resource points. Thus, by examining the to-be-examined resource points that are common to many user devices 30, the small cell base station 20 is able to search for the reverse-direction BRSs for many user devices 30.

Although the user device 30 serves as the radio reception station in this embodiment, instead of the user device 30, a GM relay station, which will be described later, may be used as the radio reception station.

Other Modifications

In the first to third embodiments, the surroundings information acquisitor 46, the arrangement pattern determiner 48, and the user-device situation information acquisitor 70 are provided in the small cell base station 20, which is the radio transmission station. However, these elements may be provided in another node, such as the macro cell base station 10 or the central control station 12, that is in the radio communication network and communicates with the small cell base station 20.

In a heterogeneous network, there can be disposed many small cell base stations 20 in the macro cell area 10A. In order for the user device 30 to distinguish from which small cell base station 20 BDSs and BRSs are transmitted, small cell base stations 20 may spread BDSs and BRSs using spread codes that differ from one another between the small cell base stations 20. Alternatively, each small cell base station 20 may use, for the BDS resource points, time points different from those used by a neighboring small cell base station 20 and/or frequency points different from those used by the neighboring small cell base station. Each small cell base station 20 may use, for the BRS resource points, time points different from those used by a neighboring small cell base station 20 and/or frequency points different from those used by the neighboring small cell base station.

In the first to third embodiments, the small cell base station 20 serves as the radio transmission station and the user device 30 serves as the radio reception station. However, the base station may serve as the radio reception station and the user device 30 may serve as the radio transmission station. The description given with regard to the first to third embodiments may be read in a way in which the downlink and the uplink are reversed, with the base station serving as the radio reception station and the user device 30 serving as the radio transmission station. In other words, the user device 30 may have many transmitting antennas and perform transmission beamforming, and the base station may measure the received power of a BDS for each beam to identify the suitable beam-direction for that base station. Based on a channel state that is obtained by utilizing an uplink BRS or a downlink reverse-direction BRS corresponding to the suitable direction, the user device 30 may determine uplink data transmission parameters suited to the base station.

Figure 36:
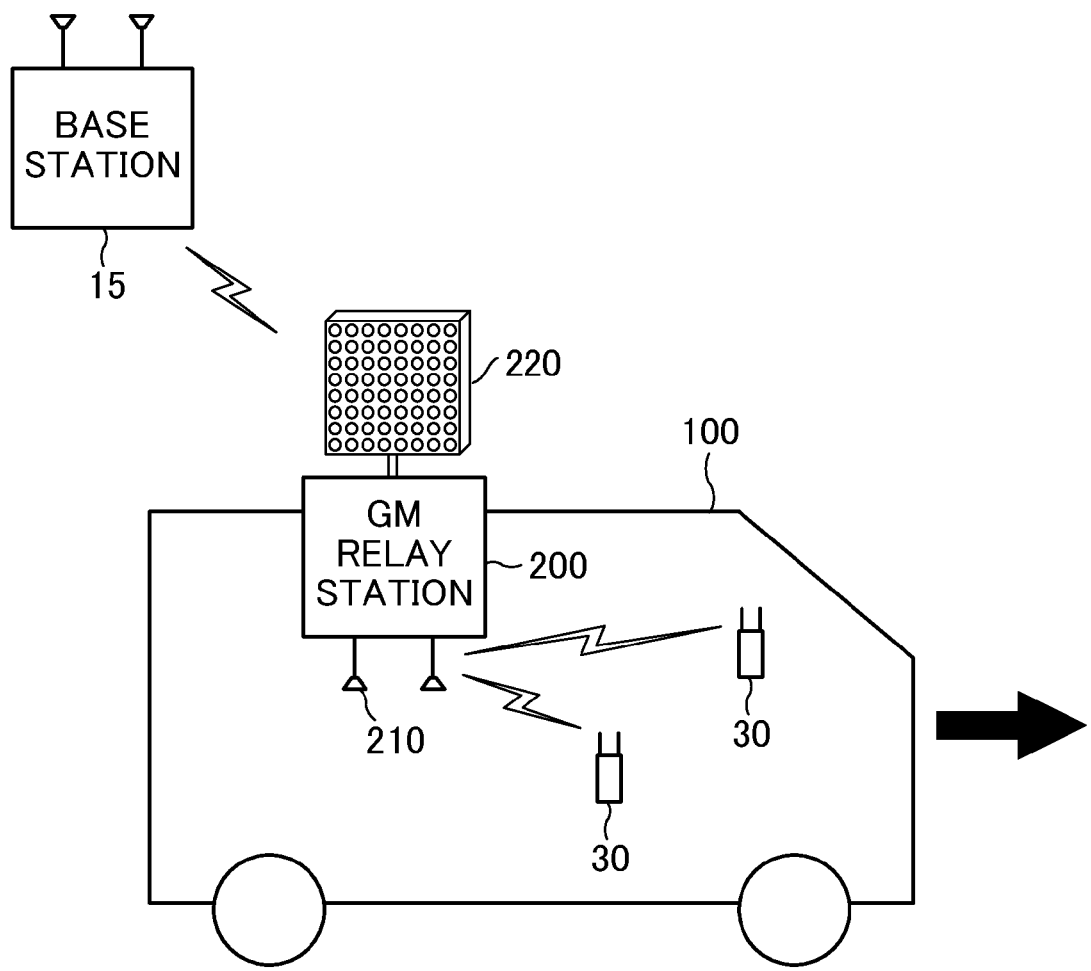
FIG. 36 is a diagram illustrating usage of a group mobility relay station that can serve as a radio transmission station of the present invention.

The GM (group mobility) relay station, instead of the user device 30, may be used as the radio transmission station. FIG. 36 shows a usage of the GM relay station. The GM relay station 200 is fixedly mounted on a mobile vehicle 100, and has a massive-MIMO antenna set 220. The GM relay station 200 communicates with a base station 15 and uses massive-MIMO for uplink communication at least to the base station 15. The base station 15 may be the macro cell base station 10 or may be the small cell base station 20. The GM relay station 200 communicates with the transceiving antennas 210 that are for communication with user devices 30. The GM relay station 200 relays communication between the base station 15 and the user devices 30 inside the vehicle 100. In other words, the GM relay station 200 receives with the antenna set 220 a downlink signal that is addressed to any of the user devices 30 in the vehicle 100 and is transmitted from the base station 15, and transmits the downlink signal addressed to that user device 30 with the transceiving antennas 210. The GM relay station 200 also receives with the transceiving antennas 210 an uplink signal that is transmitted from any of the user devices 30 in the vehicle 100, and transmits a beam of the uplink signal in the direction of the base station 15 with the antenna set 220. Although a good example of the vehicle 100 is any vehicle for public transportation that can accommodate multiple and unspecified users, such as a bus, a train, or a streetcar, the vehicle 100 may be a vehicle for personal use, such as a private car. As described above, since the relay station 200 relays signals for a group composed of multiple user devices 30 that moves with the relay station 200, the relay station 200 is referred to as the GM (group mobility) relay station.

The description given with regard to the first to third embodiments may be read in a way in which the downlink and the uplink are reversed, with the base station 15 serving as the radio reception station and the GM relay station 200 serving as the radio transmission station. In other words, the GM relay station 200 may have the massive-MIMO antenna set 220 and perform transmission beamforming, and the base station 15 may measure the received power of a BDS for each beam to identify the suitable beam-direction for that base station 15. Based on a channel state that is obtained by utilizing an uplink BRS or a downlink reverse-direction BRS corresponding to the suitable direction, the GM relay station 200 may determine uplink data transmission parameters suited to the base station. The GM relay station 200 serving as the radio transmission station may have an analyzer that analyzes an image that is taken by at least one camera, and may determine the arrangement pattern based on its analysis result. The image to be analyzed may be a still image or may be a moving image. The GM relay station 200 may have at least one optical sensor, at least one vibration sensor, or at least one acceleration sensor, and based on its analysis result, may determine the arrangement pattern of the BDS resource points (preferably, may also determine the arrangement pattern of the BRS resource points).

In the embodiments described above, the functions executed by the CPU in each element may be executed by hardware instead of by the CPU, or may be executed by a programmable logic device, such as an FPGA (Field Programmable Gate Array) or a DSP (Digital Signal Processor).

DESCRIPTION OF REFERENCE SIGNS

2 . . . base station; 2A, 2B . . . beam; 10 . . . macro cell base station; 10A . . . macro cell area; 12 . . . central control station; 20 . . . small cell base station (radio transmission station, radio reception station); 20A . . . small cell area; 30 . . . user device (radio reception station, radio transmission station); 1P . . . first period; 2P . . . second period; 22 . . . radio transmitter; 24 . . . transmitting antenna; 26 . . . radio receiver; 28 . . . receiving antenna; 40 . . . network communicator; 42 . . . storage device; 44 . . . controller; 46 . . . surroundings information acquisitor; 48 . . . arrangement pattern determiner (reverse-direction arrangement pattern determiner, arrangement pattern indicator); 50 . . . transmission controller (beamformer); 52 . . . BDS/BRS generator (beam-discovery signal generator, beam reference signal generator); 54 . . . transmission beamforming weight supplier (beamformer); 56 . . . transmission beamforming weight determiner (weight determiner); 58 . . . reception beamforming weight determiner; 60 . . . reception controller; 62 . . . demodulating decoder; 70 . . . user-device situation information acquisitor; 72 . . . channel estimator; 152 . . . BDS generator (beam-discovery signal generator); 200 . . . group mobility relay station (radio transmission station); 100 . . . vehicle; 210 . . . transceiving antenna; 220 . . . antenna set; 15 . . . base station (radio transmission station).

The invention claimed is:

1. A radio transmission station comprising:
multiple transmitting antennas configured to convert electrical signals into radio waves and emit the radio waves;
a beamformer configured to control directions of beams of the radio waves emitted from the transmitting antennas by giving beamforming weights to the electrical signals supplied to the transmitting antennas;
a beam-discovery signal generator configured to generate a beam-discovery signal that enables a radio reception station, after the radio reception station receiving the beams, to identify the directions of the beams, and configured to supply the beam-discovery signal to the beamformer in order for the transmitting antennas to emit the beams corresponding to the beam-discovery signal in multiple directions;
an arrangement pattern determiner configured to determine, based on at least a situation of the radio reception station, from among pre-prepared multiple candidates, an arrangement pattern with which multiple resource points to which the beam-discovery signal is mapped are arranged, the resource points being among communication resources, the resource points and the communication resources being defined by frequencies and times;
a radio receiver configured to receive a signal from the radio reception station; and
a weight determiner configured to determine, based on information that indicates a suitable direction among the directions of the beams corresponding to the beam-discovery signal, a suitable beamforming weight that is to be given in the beamformer to a data signal addressed to the radio reception station, the information being reported from the radio reception station and then received by the radio receiver,
wherein the situation of the radio reception station is at least one of the moving speed of the radio reception station, a moving image that is taken by a camera of the radio reception station, the location of the radio reception station, the distance from the radio transmission station to the radio reception station, and the moving distance of the radio reception station.

2. The radio transmission station according to claim 1, wherein the multiple candidates for the arrangement pattern have in common multiple to-be-examined resource points that are to be examined by the radio reception station to determine whether these resource points include the beam-discovery signal,
wherein in each of the multiple candidates, in a portion of the multiple to-be-examined resource points, there are arranged multiple beam-discovery-signal resource points to which the beam-discovery signal is mapped,
wherein the beam-discovery-signal resource points vary between the multiple candidates, and
wherein the radio transmission station does not notify the radio reception station of an arrangement of the beam-discovery-signal resource points.

3. The radio transmission station according to claim 2, further comprising:
a reverse-direction arrangement pattern determiner configured to determine, based on at least one of the surroundings of the radio transmission station and the situation of the radio reception station, from among pre-prepared multiple candidates, an arrangement pattern with which multiple resource points are arranged, in which to the multiple resource points there is mapped a reverse-direction beam reference signal that is to be transmitted with a beam that is directed from the radio reception station to a direction that is the reverse of the suitable direction;
an arrangement pattern indicator configured to indicate to the radio reception station the arrangement pattern determined by the reverse-direction arrangement pattern determiner; and
a channel estimator configured to estimate a channel state that corresponds to the suitable direction using the reverse-direction beam reference signal that is transmitted from the radio reception station in accordance with the arrangement pattern and is then received by the radio receiver.

4. The radio transmission station according to claim 3, wherein the multiple candidates for the arrangement pattern of the reverse-direction beam reference signal have in common multiple to-be-examined resource points that are to be examined by the radio transmission station to determine whether these resource points include the reverse-direction beam reference signal;

wherein in each of the multiple candidates, in a portion of the multiple to-be-examined resource points, there are arranged multiple reverse-direction beam-reference-signal resource points to which the reverse-direction beam reference signal is mapped, and wherein the reverse-direction beam-reference-signal resource points vary between the multiple candidates.

5. The radio transmission station according to claim 1, wherein the radio reception station is among multiple radio reception stations, wherein the radio transmission station is further configured to communicate with the multiple radio reception stations, and wherein the arrangement pattern determiner determines, for each of the radio reception stations, the arrangement pattern based on the situation of that radio reception station, and notifies each of the radio reception stations of the arrangement pattern for that radio reception station.

6. The radio transmission station according to claim 5, further comprising:

a reverse-direction arrangement pattern determiner configured to determine, for each of the radio reception stations, based on at least one of the surroundings of the radio transmission station and the situation of that radio reception station, from among pre-prepared multiple candidates, an arrangement pattern with which multiple resource points are arranged, in which to the multiple resource points there is mapped a reverse-direction beam reference signal that is to be transmitted with a beam that is directed from the radio reception station to a direction that is the reverse of the suitable direction;

an arrangement pattern indicator configured to indicate to the radio reception station the arrangement pattern determined by the reverse-direction arrangement pattern determiner; and a channel estimator configured to estimate a channel state that corresponds to the suitable direction using the reverse-direction beam reference signal that is transmitted from the radio reception station in accordance with the arrangement pattern and is then received by the radio receiver.

7. The radio transmission station according to claim 6, wherein the multiple candidates for the arrangement pattern of the reverse-direction beam reference signal have in common multiple to-be-examined resource points that are to be examined by each radio transmission station to determine whether these resource points include the reverse-direction beam reference signal;

wherein in each of the multiple candidates, in a portion of the multiple to-be-examined resource points, there are arranged multiple reverse-direction beam-reference-signal resource points to which the reverse-direction beam reference signal is mapped, and wherein the reverse-direction beam-reference-signal resource points vary between the multiple candidates.

8. The radio transmission station according to claim 1, further comprising a beam reference signal generator configured to generate a beam reference signal that enables the radio reception station to estimate a channel state that corresponds to the suitable direction, and configured to supply the beam reference signal to the beamformer, wherein the beamformer gives the suitable beamforming weight to the beam reference signal, and wherein the arrangement pattern determiner, based on at least one of the surroundings of the radio transmission station and the situation of the radio reception station, from among pre-prepared multiple candidates, determines an arrangement pattern with which multiple resource points are arranged, in which to the multiple resource points there are mapped the beam-discovery signal and the beam reference signal.

9. The radio transmission station according to claim 8, wherein the multiple candidates for the arrangement pattern have in common multiple to-be-examined resource points that are to be examined by the radio reception station to determine whether these resource points include the beam-discovery signal and the beam reference signal, wherein in each of the multiple candidates, in a portion of the multiple to-be-examined resource points, there are arranged multiple beam-discovery-signal resource points and multiple beam-reference-signal resource points, the beam-discovery signal being mapped to the multiple beam-discovery-signal resource points, the beam reference signal being mapped to the multiple beam-reference-signal resource points, wherein only the beam-discovery-signal resource points, only the beam-reference-signal resource points, or both of the beam-discovery-signal resource points and the beam-reference-signal resource points vary between the multiple candidates, and wherein the radio transmission station does not notify the radio reception station of an arrangement of the beam-discovery-signal resource points and the beam-reference-signal resource points.

10. The radio transmission station according to claim 8, wherein the radio reception station is among multiple radio reception stations, wherein the radio transmission station is further configured to communicate with the multiple radio reception stations, and wherein the arrangement pattern determiner determines, for each of the radio reception stations, the arrangement pattern based on the situation of that radio reception station, and notifies each of the radio reception stations of the arrangement pattern for that radio reception station.

11. The radio transmission station according to claim 1, further comprising:

a reverse-direction arrangement pattern determiner configured to determine, based on at least one of the surroundings of the radio transmission station and the situation of the radio reception station, from among pre-prepared multiple candidates, an arrangement pattern with which multiple resource points are arranged, in which to the multiple resource points there is mapped a reverse-direction beam reference signal that is to be transmitted with a beam that is directed from the radio reception station to a direction that is the reverse of the suitable direction;

an arrangement pattern indicator configured to indicate to the radio reception station the arrangement pattern determined by the reverse-direction arrangement pattern determiner; and a channel estimator configured to estimate a channel state that corresponds to the suitable direction using the reverse-direction beam reference signal that is transmitted from the radio reception station in accordance with the arrangement pattern and is then received by the radio receiver.

12. The radio transmission station according to claim 11, wherein the multiple candidates for the arrangement pattern of the reverse-direction beam reference signal have in common multiple to-be-examined resource points that are to be examined by the radio transmission station to determine whether these resource points include the reverse-direction beam reference signal;

wherein in each of the multiple candidates, in a portion of the multiple to-be-examined resource points, there are arranged multiple reverse-direction beam-reference-signal resource points to which the reverse-direction beam reference signal is mapped, and wherein the reverse-direction beam-reference-signal resource points vary between the multiple candidates.

13. A radio communication network that comprises a radio transmission station and an arrangement pattern determiner configured to communicate with the radio transmission station, the radio transmission station comprising:

multiple transmitting antennas configured to convert electrical signals into radio waves and emit the radio waves;

a beamformer configured to control directions of beams of the radio waves emitted from the transmitting antennas by giving beamforming weights to the electrical signals supplied to the transmitting antennas;

a beam-discovery signal generator configured to generate a beam-discovery signal that enables a radio reception station, after the radio reception station receiving the beams, to identify the directions of the beams, and configured to supply the beam-discovery signal to the beamformer in order for the transmitting antennas to emit the beams corresponding to the beam-discovery signal in multiple directions;

a radio receiver configured to receive a signal from the radio reception station; and a weight determiner configured to determine, based on information that indicates a suitable direction among the directions of the beams corresponding to the beam-discovery signal, a suitable beamforming weight that is to be given in the beamformer to a data signal addressed to the radio reception station, the information being reported from the radio reception station and then received by the radio receiver;

wherein the arrangement pattern determiner is further configured to determine, based on at least a situation of the radio reception station, from among pre-prepared multiple candidates, an arrangement pattern with which multiple resource points to which the beam-discovery signal is mapped are arranged, the resource points being among communication resources, the resource points and the communication resources being defined by frequencies and times, wherein the situation of the radio reception station is at least one of the moving speed of the radio reception station, a moving image that is taken by a camera of the radio reception station, the location of the radio reception station, the distance from the radio transmission station to the radio reception station, and the moving distance of the radio reception station.

* * * * *